(12) United States Patent
Weimin et al.

(10) Patent No.: US 11,470,817 B2
(45) Date of Patent: Oct. 18, 2022

(54) PET SPRAY TRAINING SYSTEM

(71) Applicant: Radio Systems Corporation, Knoxville, TN (US)

(72) Inventors: Bai Weimin, GuangDong (CN); Anthony J. Reinhart, Loudon, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 17/101,345

(22) Filed: Nov. 23, 2020

(65) Prior Publication Data

US 2021/0086211 A1 Mar. 25, 2021

Related U.S. Application Data

(63) Continuation of application No. 16/167,907, filed on Oct. 23, 2018, now Pat. No. 11,197,461, which is a continuation-in-part of application No. 15/493,190, filed on Apr. 21, 2017, now Pat. No. 11,185,052.

(51) Int. Cl.
| | |
|---|---|
| *A01K 15/02* | (2006.01) |
| *A01K 27/00* | (2006.01) |
| *B05B 12/12* | (2006.01) |
| *B65D 83/26* | (2006.01) |

(52) U.S. Cl.
CPC .......... *A01K 15/022* (2013.01); *A01K 27/007* (2013.01); *A01K 27/009* (2013.01); *A01K 27/001* (2013.01); *B05B 12/122* (2013.01); *B65D 83/262* (2013.01)

(58) Field of Classification Search
CPC ............................ A01K 15/022; A01K 27/007
See application file for complete search history.

(56) References Cited

U.S. PATENT DOCUMENTS

| | | | | |
|---|---|---|---|---|
| 4,180,013 A | * | 12/1979 | Smith ................ | A01K 15/022 119/908 |
| 4,627,385 A | * | 12/1986 | Vinci ................. | A01K 15/022 239/152 |
| 8,069,823 B2 | * | 12/2011 | Mainini ............. | A01K 27/009 119/718 |
| 11,185,052 B2 | * | 11/2021 | Weimin ............. | A01K 27/001 |
| 11,197,461 B2 | * | 12/2021 | Weimin ............. | A01K 15/022 |

* cited by examiner

Primary Examiner — Jessica B Wong
(74) Attorney, Agent, or Firm — Baker Donelson Bearman Caldwell & Berkowitz PC

(57) ABSTRACT

An pet spray training system is provided. The system includes a sound, vibration or motion sensor that is configured to generate electrical signals in response to an occurrence. The system may include a filter, which is tuned to recognize a dog barking event, and generate an electrical signal in response to recognizing an input signal indicative of a dog's bark. The system further includes a removably pressurized gas reservoir that holds a deterrent fluid under pressure. The system additionally comprises a motor module configured to rotate a shaft in response to the electrical signal from the filter. The canister has a spray nozzle for releasing fluid that affects the dog's senses. In response to rotating the shaft, the spray nozzle is depressed.

7 Claims, 18 Drawing Sheets

PET SPRAY TRAINING SYSTEM

CROSS REFERENCE TO RELATED APPLICATIONS

This application is a continuation application of U.S. application Ser. No. 16/167,907, filed Oct. 23, 2018, which is a continuation in part application of U.S. application Ser. No. 15/493,190, filed Apr. 21, 2017.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of pet training. More particularly, the invention relates to an improved portable spray system used as an aversive for animal behavior modification, such as controlling the barking of a pet dog.

TECHNOLOGY IN THE FIELD OF THE INVENTION

Many people who live in populated areas enjoy the companionship of dogs. Such individuals frequently live in apartment complexes, condominium complexes, garden home communities, zero lot line homes, lofts or high rise developments. In these instances, residents are living in close proximity to one another. Such close living arrangements may provide a feeling of community, may provide a convenient location for work, may provide affordable housing, may provide for a low-maintenance lifestyle, or may provide a lifestyle deemed to be vibrant or culturally stimulating.

At the same time, dog owners living in these circumstances face the challenge of controlling excessive or unwanted barking from a pet dog. In this respect, dogs have a habit of barking at strange noises, either as a protective habit or out of unwarranted fear or territorialism. Dogs also bark at other pets and at people. Such barking is a nuisance to neighbors living close by, and even to the dog owners themselves. This can produce conflicts between neighbors, and even litigation where barking is deemed to be an ongoing nuisance.

Various techniques have been developed to control the barking of a dog. First, barking can be controlled by the surgical removal of the larynx. However, this solution is usually unacceptable to pet owners as unnecessarily cruel and expensive. Second, standard obedience techniques can be used to train a dog not to bark, but this is time consuming and often requires the presence of the owner to correct the dog. If the owner is absent from the home for long periods of time, such as at work, the dog may learn to refrain from barking only when the owner is present, remaining a nuisance while the owner is away. Third, a muzzle can be utilized to prevent a dog from barking. However, the muzzle must be periodically removed to allow the dog to eat or drink which restores the need for supervision. Finally, remote and automatic systems using various trigger mechanisms (primarily electrical stimuli) have been developed to control the barking of a dog. However, not every pet owner wants to apply electrodes to the throat of a pet, particularly when the pet is small or frail.

One technique that has proved successful and that has been deemed particularly humane is the use of a spray canister. U.S. Pat. No. 4,627,385 entitled "Bark Restraining system for Dogs" discloses a collar unit having an electronic circuit. The circuit includes a microphone with a filter, such as the filter shown in U.S. Pat. No. 8,714,113. Such a filter is sensitive to frequencies that correspond to those of the bark of a dog. When barking is sensed, the circuit actuates a valve that is associated with a pressurized tank of compressed gas or other fluid. When activated, the valve releases a spray of the fluid from a tank in the region of the head of the dog. The substance is designed to affect the senses of the dog, particularly the sense of smell. The '113 patent is incorporated herein by reference in its entirety.

In one aspect of the '385 patent, the electronic circuit is responsive to a signal from a remote transmitter carried by the pet owner or a trainer. The remote transmitter is shown in FIG. 7 of the '385 patent. The transmitter permits the owner or trainer to remotely actuate the release of the spray as part of the training of the dog. U.S. Pat. No. 4,627,385 is also incorporated herein by reference in its entirety.

Since the '385 patent issued in 1986, a variety of "spray trainers" have been placed on the market. Some spray trainers are associated with a dog collar, while others (typically directed towards cats) represent free-standing spray canisters equipped with motion sensors. In any of these instances, pressurized canisters having a solenoid release mechanism have been used. The canisters are filled in a "clean room," under pressure, at the factory before packaging for sale.

The currently-available collar-mounted, pressurized spray canisters utilize a refill valve, a separate spray valve and a solenoid releasing mechanism. These canisters can be difficult or complex to produce in high volume.

Accordingly, a need exists for an improved spray mechanism used for training pets that utilizes easily replaceable pressurized canisters. A need further exists for a spray training system that does not require a refillable tank or a pump mechanism for an unpressurized canister. Further, a need exists for a spray training mechanism that utilizes a small electrical motor that releases pressurized fluid rather than a pump that acts on an unpressurized container, which is prone to leakage.

BRIEF SUMMARY OF THE INVENTION

An pet spray training system is first provided herein. In one embodiment, the pet spray training system includes a sensor (such as a microphone). The sensor is configured to receive an input (such as sound frequencies), and to generate electrical signals in response.

The system also includes a filter. The filter is tuned to recognize input signals received by and emitted in proximity to the sensor. The filter is part of circuitry that generates an electrical behavior modification signal in response to recognizing signal input characteristic of the bark of a dog.

The system further includes a first canister. The first canister holds a bark deterrent fluid at positive pressure. Preferably, the bark deterrent fluid comprises a solution that stimulates one or more senses of a dog. For example, the solution may be sensed by the dog's sense of smell, hearing or touch. In one aspect, the stimulation is an offensive or "aversive" stimulation. In one aspect, the fluid is an irritant to a membrane of a dog.

The system additionally comprises a motor module. The motor module is configured to rotate a shaft for a designated period of time in response to conditioned electrical signals from the filter indicative of the bark of a dog.

In one embodiment, the system includes an elongated motor arm. In this embodiment, the system includes a gear operatively connected to the shaft and configured to move the elongated motor arm linearly in response to rotation of the shaft. Preferably, the gear is part of a gear assembly having at least two gears, and possibly three or four gears of progressive size, with one of the gears engaging the elongated motor arm. In this instance, the elongated motor arm will comprise teeth that mate with teeth of the engaging gear.

Still further, the system comprises a spray nozzle. The spray nozzle is associated with the first canister.

The system additionally includes an actuation arm. The actuation arm is pivotally connected to the elongated motor arm and is configured to depress the spray nozzle when the electrical motor is actuated to move the elongated motor arm in a first linear direction. This serves to release a short stream of bark deterrent fluid. The actuation arm is further configured to disengage the spray nozzle when the electrical motor remains actuated to move the motor arm in a second opposite linear direction, thereby closing off the release of bark deterrent fluid.

In another embodiment, the system include a cam. The cam defines a cam surface that acts on an actuation arm. In this embodiment, the system again includes a gear operatively connected to the shaft. However, in this instance the gear (or gear assembly) rotates the cam and associated cam surface in order to momentarily depress the spray nozzle. In this arrangement, continued actuation of the electrical motor causes the cam to continue rotating, which in turn cyclically depresses and releases the spray nozzle. Preferably, only one spray cycle is provided.

The system also comprises a battery. The battery is arranged to provide power to the electrical motor module and to any other electrical components, such as an optional wireless receiver or programmable logic controller.

Preferably, the pet spray training system also includes a housing. The housing is configured to hold at least the sensor, the filter, the motor module and the battery. The housing includes a connector, such as a slot or opposing loops, for connecting the housing to the collar of a dog.

In one embodiment, the housing includes a spray opening through which the deterrent fluid is emitted under pressure when the actuation arm engages the spray nozzle. In addition, the housing includes a slot for receiving the first canister. The spray nozzle aligns with the spray opening when the canister is placed in the slot. The housing may further comprise an access cover. The access cover is configured to expose the slot when the cover is pivotally opened. This enables removal and replacement of the first canister, as needed.

In one embodiment, the system communicates with a remote transmitter. The transmitter is configured to send a wireless bark deterrent signal in response to manual actuation, such as by a pet owner pushing a button. The system also includes a receiver located on the collar, such as on the housing. The receiver is configured to receive the bark deterrent signal wirelessly, and in response generate the electrical behavior modification signal. The electrical motor is configured to rotate the shaft for the designated period of time in response to the electrical behavioral modification signal from the receiver. This ultimately causes a stream of the bark deterrent fluid to be released through the spray nozzle. In this way, the system can also be remotely operated by a pet owner.

In another embodiment, the system is part of a system that includes a remote transmitter that is part of a stationary unit. The transmitter is configured to send a wireless bark deterrent signal to the receiver on the collar in response to on-board bark sensing and filtering electronics on a stationary bark-sensing and transmitting system. The system also includes a receiver co-located on the collar or otherwise along the housing. The receiver is configured to receive the bark deterrent signal as transmitted by the remote, stationary bark-sensing system, and in response, generate an electrical behavior modification signal. The electrical motor is configured to rotate the shaft and ultimately cause the actuation arm to engage the spray nozzle of the first canister in response to the electrical behavior modification signal delivered by the receiver (or related processor). Ultimately, this causes a stream of the bark deterrent fluid to be released through the spray nozzle along the collar. In this way, the system can discourage barking in a designated location such as a nursery.

In yet another embodiment, the system is generally free-standing, that is, no portion resides along a collar, and includes a sensor, a filter, an electric motor module and a fluid canister. The sensor and filter are configured to receive input signals (such as sound frequencies) and to generate electrical signals in response to recognizing input signals characteristic of the bark of a dog. The electrical motor module is configured to cause fluid to be emitted from the canister in response to the electrical signal from the sensor/filter, and to cause a stream of fluid to be released upon the recognition of a bark. In this way, the system is free-standing and can be moved to a room to discourage barking in the room where the bark deterrent system is located.

In yet another embodiment, the system is again free-standing and portable, but this time includes a motion sensor along with the filter, electric motor module and the fluid canister. The motion sensor is configured to receive motion signals and to generate electrical signals in response to sensing motion characteristic of the movement of a pet. The electrical motor is configured to rotate a gear in response to the electrical signal from the motion sensor, and to ultimately cause a stream of deterrent fluid to be released upon the recognition of pet movement in an area. In this way, the system can discourage the presence of a pet in a designated location where the system is placed, such as a kitchen or nursery or office.

In still another embodiment, the system comprises a second canister containing a behavior reinforcement fluid, wherein the behavior reinforcement fluid comprises a solution that is pleasing to a dog's sense of smell to provide positive reinforcement. A remote transmitter is again offered, which is configured to send a behavior reinforcement signal in response to manual actuation to a receiver. The receiver is located along a collar, such as within a housing. The electrical motor is configured to rotate a shaft, which causes a spray nozzle to be depressed, which then causes fluid from the second canister to be released in response to the electrical behavior modification signal from the receiver.

In another embodiment, the system further comprises a tone generation element that can be used independently or in concert with either the deterrent fluid or the reinforcement fluid. The generated tone may be a deterrent tone or a reinforcement tone, used with the deterrent fluid or the reinforcement fluid, respectively. Alternatively, the system further comprises a vibratory element such as a micro-motor that delivers vibration to the dog as a deterrent signal.

A method for modifying the behavior of an animal is also provided herein. The method employs the pet spray training systems described above, in any of their various embodiments.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 6 shows a remote transmitter that communicates with the system via manually actuated wireless signals.

FIG. 7 shows a remote stationary receiver that communicates with the system via wireless signals.

FIG. 8 shows a remote stationary system with a microphone that senses the barking of a dog.

FIG. 9 shows a remote stationary system with a motion detecting sensor and a spray canister.

FIG. 10 also shows a stationary system with a motion detecting sensor. Here, the spray canister is associated with a dog collar.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the system in use or operation in addition to the orientation depicted in the figures. For example, if the system in the figures is turned over or rotated, elements described as "below" or "beneath" other elements or features would then be oriented "above" the other elements or features. Thus, the exemplary term "below" can encompass both an orientation of above and below.

Description of Selected Specific Embodiments

Figure 1:
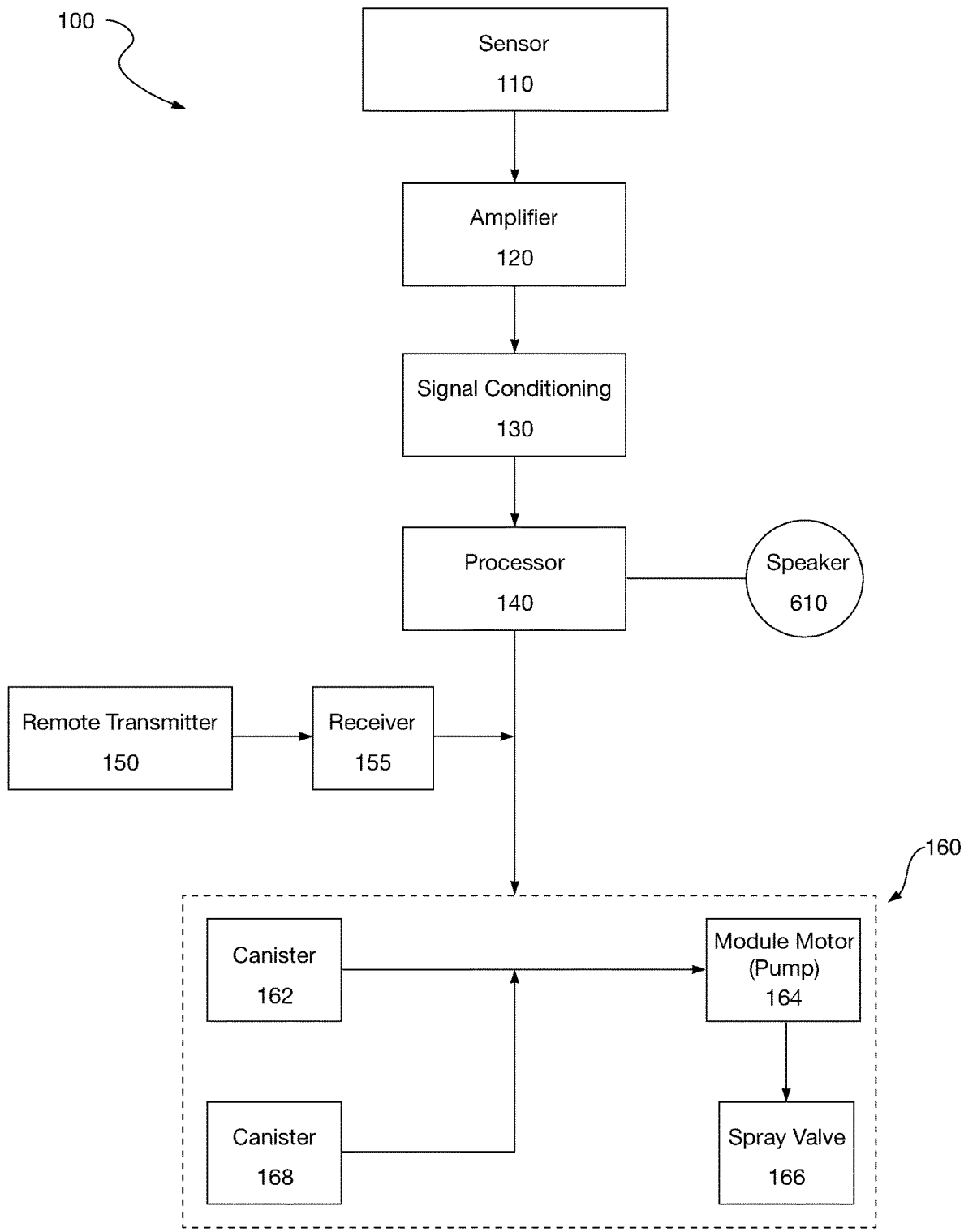
FIG. 1 is a schematic view of the pet spray training system of the present invention, in one embodiment.

FIG. 1 is a schematic view of pet spray training system or device 100 of the present invention, in one embodiment. A plurality of components for the system 100 are shown. In some embodiments, the components are intended to reside on the collar of a dog. An illustrative collar is shown at 600 in FIG. 6, placed around a pet 650. It is understood that the term "collar" may include a harness or other similar system.

Referring back to FIG. 1, the system 100 first includes a sensor 110. The sensor 110 may be any system that is responsive to the bark of the dog. In one embodiment, the sensor 110 is a piezoelectric vibration sensor that is in contact with the dog for measuring vibrations produced by the dog. The piezoelectric sensor is a low current device used for detecting the barking of a dog. In one aspect, the sensor 110 is placed in contact with the throat of the dog so as to measure vibrations produced by the vocal cords of the dog. Such an embodiment is described in detail in U.S. Pat. No. 6,668,760 entitled "Spray Control Anti-Bark Collar," the entirety of which is incorporated herein by reference in its entirety.

In a more preferred embodiment, the sensor 110 is a microphone. The microphone 110 is configured to receive sound frequencies emitted in proximity to the dog collar. In response, the microphone 110 generates electrical signals.

The electrical signals from the microphone 110 are taken through a conditioning process. In one aspect, this includes amplification. Thus, the pet spray training system 100 may also include an amplifier 120. The amplifier 120 is coupled to the sensor 110 and amplifies the electrical signal output of the vibration (or sound) sensor 110 to increase the level of the sensor output for further processing and more accurate sampling.

The pet spray training system 100 optionally includes a circuit 130 for further signal conditioning of the electrical signal output of the amplifier 120. The signal conditioning circuit 130 serves to discriminate among the vibrations or sound frequencies measured by the sensor 110 so as to pass only measured vibrations or frequencies that meet specified criteria. For example, the signal conditioning circuit 130 may be configured to filter out frequencies not indicative of the bark of a dog, or to pass only those vibrations signals occurring within a specified frequency range or those meeting certain durational limits. The signal conditioning circuit 130 may be configured to eliminate unwanted output electrical signals from the sensor 110 output. Those skilled in the art will recognize the various filters, amplifiers and other signal conditioning devices that can be used to prepare the measured frequencies or vibrations for further processing. Those skilled in the art will also recognize that the type of signal conditioning depends upon the input signal, the corresponding sensor and the desired characteristics of the input signal that are to be monitored. For example, the signal conditioning or filter may be active or passive and may be set to pass a specific frequency range or to remove high or low frequency noise. Further, depending upon the various components used, the output signal may not require additional amplification. Finally, other conditioning may be required to present a useable sensor output to the remainder of the circuit.

As part of the filtering process, a controller or processor 140 monitors the amplified output and activates a stimulus delivery mechanism 160. In the present invention, the stimulus delivery mechanism 160 is a so-called spray trainer. Decision-making logic within the processor 140 determines whether a spray is needed through the actuation of the stimulus delivery mechanism 160. Typically, the input to the processor 140 is compared against a reference value to determine whether a spray-type stimulus is warranted. A conventional processing device 140 includes an internal timer, memory registers and math capabilities allowing sophisticated signal processing to occur; however, those skilled in the art will recognize that these capabilities can be achieved using other components without departing from the spirit and scope of the present invention, such as through firmware. Further, those skilled in the art will recognize that the electrical components used depend on various factors including the cost of manufacture, size and weight constraints and the complexity of the decision process. For example, the size and weight of the training collar worn by the animal is reduced by implementing the controller in a single application specific integrated circuit (ASIC) or a microprocessor, both of which allow complex decision making capabilities. For lower cost, larger units implementing a simple decision tree, or an array of discrete logic components can be used.

In the illustrated embodiment for the pet spray training system 100, the stimulus delivery mechanism 160 is a spray mechanism that delivers a controlled dose of a bark deterrent substance or fluid. The spray delivery mechanism 160 includes a first canister (or cartridge, or tank) 162, a motor module 164 and a depressible spray valve or nozzle 166. The bark deterrent substance is held within the canister 162 under pressure, and represents a solution that affects the olfactory (or other) senses of the dog.

The deterrent substance is selected to be irritating or disturbing to the dog. A commonly used deterrent stimulus is a citronella liquid; however, those skilled in the art will recognize other deterrent substances that can be used without departing from the scope and spirit of the present invention, for example compressed air or water. In addition, those skilled in the art will recognize that the sound of the substance escaping under pressure provides a secondary deterrent function. Thus, in one aspect the pet spray training system 100 also includes a speaker 610. The speaker 610 is associated with the processor 140, and is configured to emit a sound that emulates a spray of fluid in response to conditioned electrical signals from the filter indicative of the bark of a dog. This is particularly useful if the canister 162 becomes depleted of fluid. Alternatively, a micro-motor is provided as element 610, which vibrates in response to receiving an actuation signal.

Figure 2A:
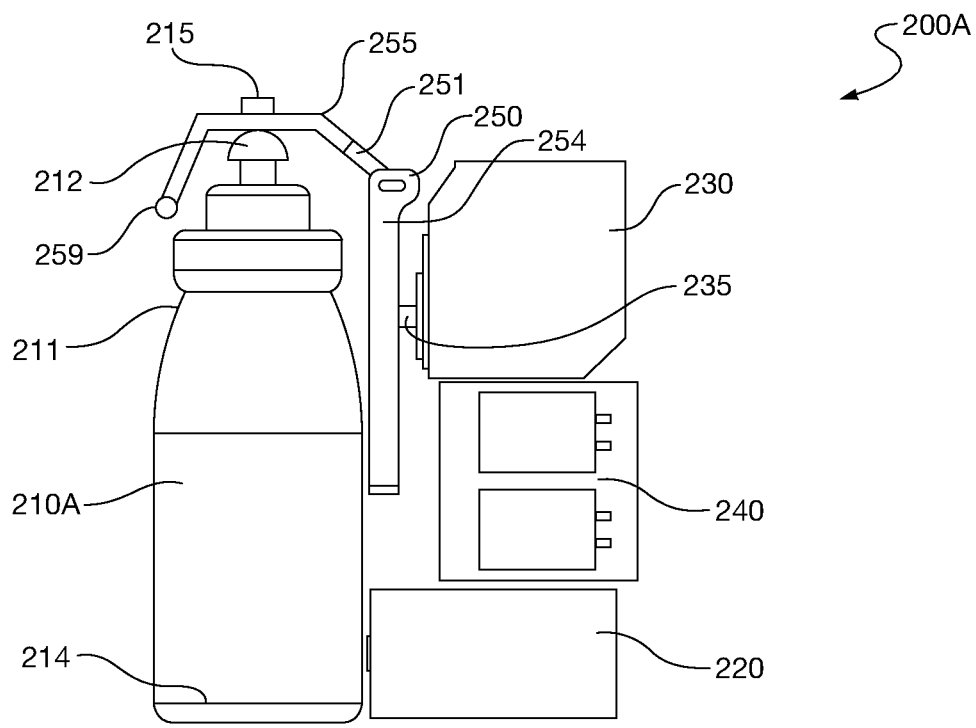
FIG. 2A is a schematic view of a single stroke pet spray system that utilizes an electric motor module to turn a shaft, in one embodiment. Rotation of the shaft ultimately causes a spray nozzle associated with a canister to be depressed, thereby releasing a spray of behavior modification fluid. In this view, a canister having a cylindrical configuration is used.

FIG. 2A is a schematic view of a single-stroke pet spray system 200A, in one embodiment. The pet spray system 200A includes a pressurized canister 210A. In this arrangement, the canister 210A has a cylindrical configuration and sealingly holds a behavior modification fluid such as a bark deterrent fluid.

The canister 210A has an upper end 211 and a lower end 214. The upper end 211 comprises a bell-shaped shoulder 212 fixedly connected to a spray nozzle 215. When the shoulder 212 is depressed, the bark deterrent fluid is released as a spray or mist from the canister 210A through the spray nozzle 215.

The pet spray system 200A also includes electrical circuitry, shown schematically as printed circuit board (circuitry) 220. The circuitry/board 220 includes the sensor 110, the amplifier 120, the signal conditioning circuit 130 and the processor 140 of FIG. 1. The circuitry 220 may also, in some embodiments described further below, include a receiver. The receiver, shown in FIG. 1 at 155, is designed to receive an external actuation signal.

The pet spray system 200A utilizes an electrical motor module 230. The motor module 230 receives an electrical behavior modification signal from the circuitry 220 when a sound indicative of the bark of a dog is picked up or sensed. This causes the motor module 230 to rotate a shaft 235, which is mechanically engaged with a gear assembly (seen best at 260 in FIG. 4A). The gear assembly 260 will include at least one gear configured to engage an elongated motor arm 250. The motor arm 250 may be a rack portion of a rack and pinion type arrangement, which moves linearly while being driven by the turning of the gear for a designated period of time.

The pet spray system 200A also includes an actuation arm 255, as seen in FIG. 2A. The actuation arm 255 has a proximal end 251 and a distal end 259. The proximal end 251 is pivotally connected to an upper end of the motor arm 250 while the distal end 259 is pivotally connected to a housing (seen at 300 in FIGS. 4A and 4C). The actuation arm 255 is connected to or otherwise passes along the shoulder 212 at the spray nozzle 215.

The pet spray system 200A further includes one or more batteries 240. The batteries 240 are configured to supply electrical power to the components of the circuitry 220 and to the electric motor module 230. In one aspect, the circuitry 220 includes a timer that controls the length of time the motor module 230 is actuated to turn the shaft 235.

In operation, a signal is sent from the electrical circuitry 220 to the electric motor module 230. The signal may be sent in response to a condition being sensed by a sensor 110. In one aspect, the sensor 110 is an on-board microphone that detects the barking of the dog. In another aspect, the sensor is a microphone located in a separate (or remote) sensing unit. In still another aspect, the condition is the sensed motion of a dog detected in a room that is considered off-limits to the dog. In this latter arrangement, the motion detector is again a separate (or remote) sensing unit. The remote sensing unit has a transmitter that sends an actuation signal as discussed more fully below in connection with FIGS. 8, 9 and 10.

In any instance, upon receipt of the actuation signal, the motor module 230 is activated for a designated period of time according to the timer of the electrical circuitry 220. Activation of the motor module 230 rotates the shaft 235, which in turn rotates one or more gears in a gear assembly 260. An ultimate gear (shown in FIG. 4B at 262) engages the elongated motor arm 250, causing the motor arm 250 to move linearly. In the arrangement of FIG. 2A, the motor arm 250 is caused to move down relative to the spray nozzle 215 upon the sensing of a bark by the sensor 110 and the resulting electronic signal sent to and processed by the processor 140.

As noted, the upper end 254 of the elongated motor arm 250 is pivotally connected to the proximal end 251 of the actuation arm 255. Movement of the motor arm 250 downwardly causes the actuation arm 255 to engage the shoulder 212 at the spray nozzle 215, causing the spray nozzle 215 to also move downwardly with respect to the canister 210A. This, in turn, releases a spray of the pressurized bark deterrent (or other behavior modification) fluid from the nozzle 215. Thus, rotation of the shaft 235 ultimately causes the spray nozzle 215 associated with the canister 210A to be depressed, releasing a spray of behavior modification fluid under pressure.

Figure 2B:
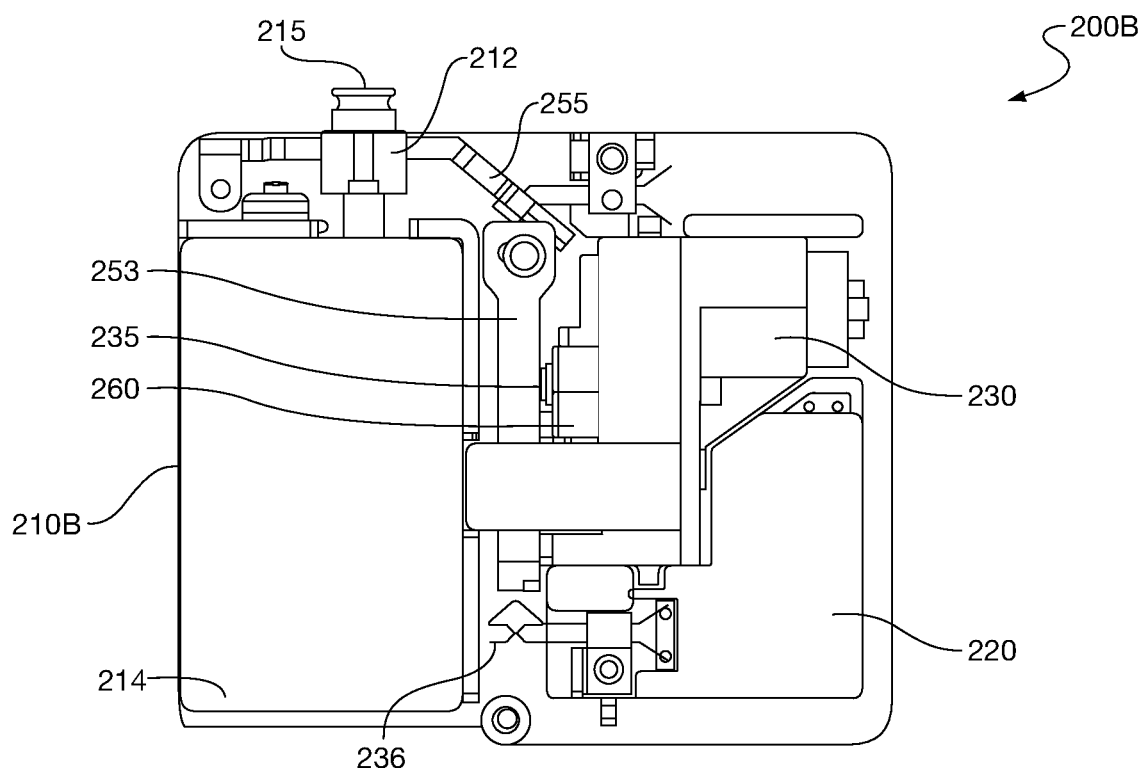
FIG. 2B is another schematic view of a single stroke pet spray system that utilizes an electrical motor module to turn a shaft, in a second embodiment. Rotation of the shaft again ultimately causes a spray nozzle associated with a canister to be depressed, thereby releasing a spray of behavior modification fluid. In this view, the canister has a rectangular prism configuration.

FIG. 2B is a cross-sectional schematic view of another single-stroke pet spray system 200B that utilizes an electrical motor module 230 to turn a shaft 235. The system 200B works in accordance with the system 200A of FIG. 2A. In this respect, a sensor 110 is used to detect a condition such as the barking of a dog or the movement of a dog. Upon sensing, an actuation signal is sent to cause the motor module 230 to rotate the shaft 235. This ultimately causes the spray nozzle 215 associated with a canister 210B to be depressed, releasing a spray of behavior modification fluid under pressure.

In the arrangement of FIG. 2B, the canister 210B has a rectangular prism configuration. For pricing advantage, the canister 210B may be a modified cigarette lighter housing. Of course, the pressurized fluid inside the canister 210B would be a behavior modification fluid such as a bark deterrent fluid and not so-called lighter fluid.

Figure 3A:
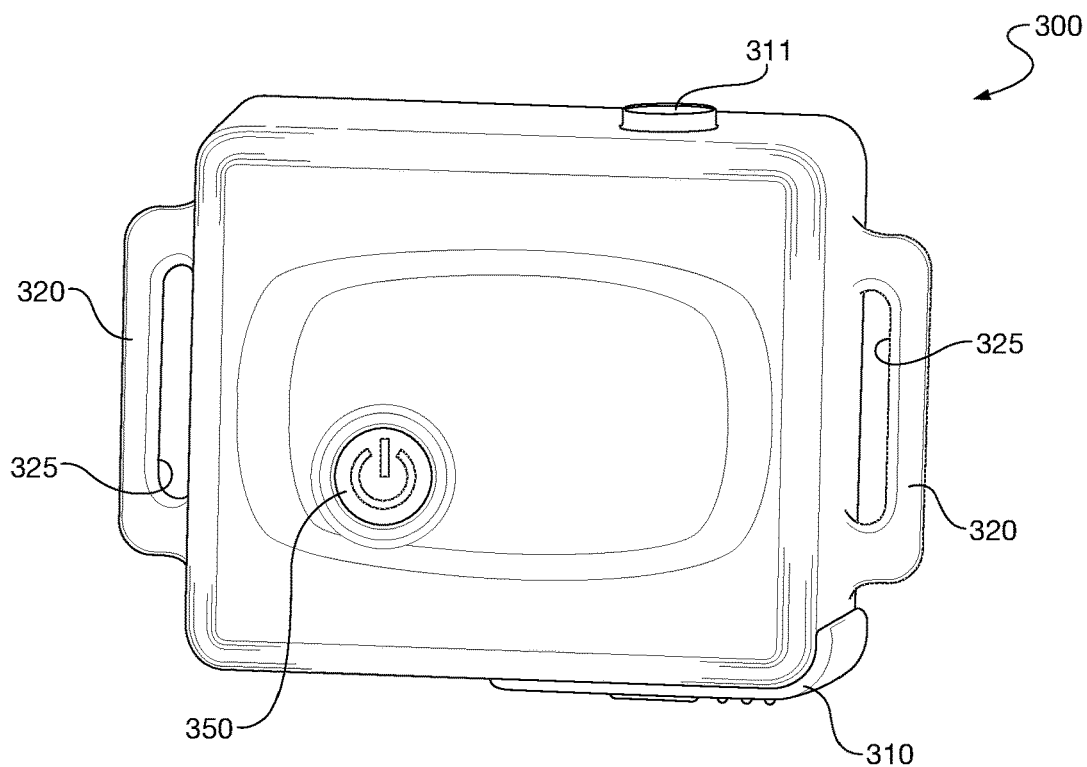
FIG. 3A is a perspective view of an illustrative housing as may be used to hold the systems of either FIG. 2A or FIG. 2B.

FIG. 3A is a perspective view of an illustrative housing 300 as may be used to hold the system 200A or 200B of FIG. 2A or FIG. 2B, respectively. The housing 300 is preferably fabricated from a light-weight but durable polycarbonate material. The housing 300 includes a front panel 310 that in one aspect is removable, such as through a clamshell or snap-on/snap-off arrangement or screws. The housing 300 may offer a power button 350 that enables the pet owner to turn the pet spray system 200A or 200B on and off. The housing 300 also includes an opening 311 along an edge which is aligned with the nozzle to allow the spray from the nozzle 215 through the opening 311 upon actuation of the system.

The housing arrangement 300 of FIG. 3A is designed to be attached to a collar (such as collar 600 shown in FIGS. 6, 7 and 10) of a pet dog 650. To this end, the illustrative housing 300 offers opposing loops 320 with respective through-openings 325. The through-openings 325 are dimensioned to receive the collar 600 to secure the housing 300 and pet spray system (200A or 200B) to the animal. It is understood that for purposes of the present disclosure, a collar includes a harness of any type.

Figure 3B:
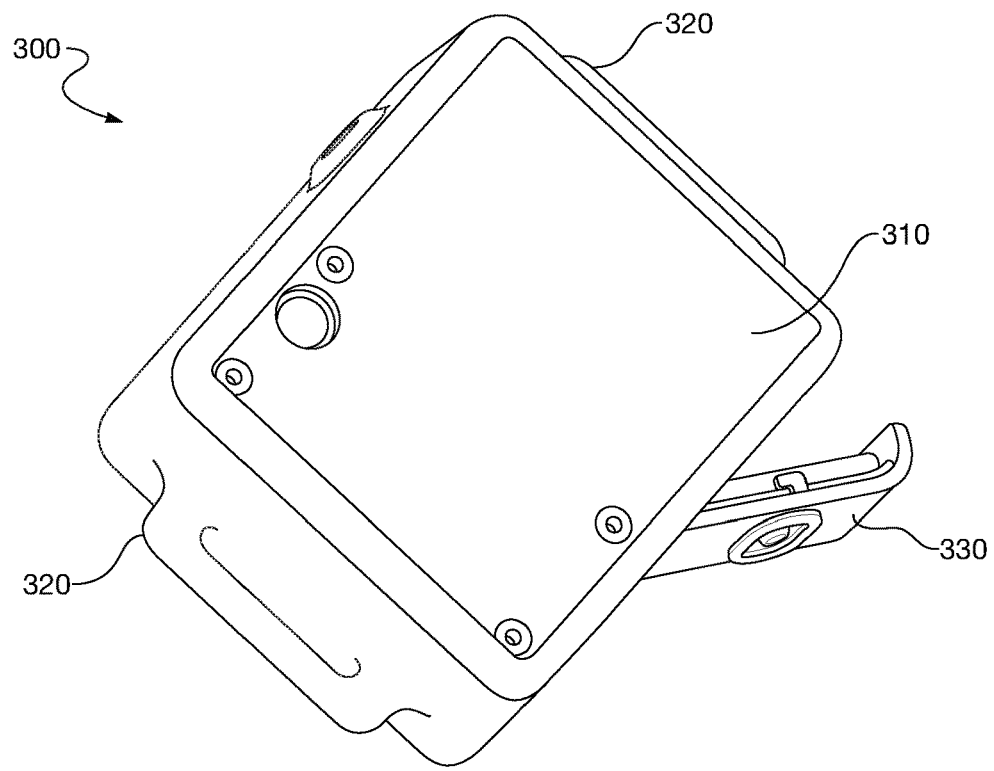
FIG. 3B is a perspective view of the housing of FIG. 3A, wherein an access cover is opened. In addition, a portion of the front panel of the housing has been lifted off.

FIG. 3B is a perspective view of the housing 300 of FIG. 3A, wherein an access cover 330 is opened. In addition, a portion of the front panel 310 of the housing 300 has been lifted off.

Figure 3C:
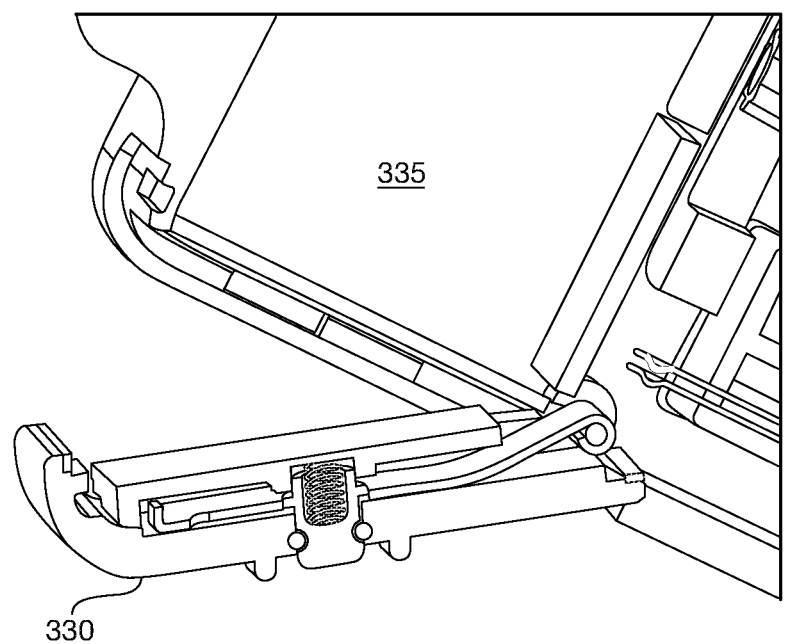
FIG. 3C is an enlarged perspective view of a portion of the housing of FIG. 3A. In this view, an access cover is shown in an opened position.

FIG. 3C is an enlarged perspective view of the housing 300 of FIG. 3A. In this view, the access cover 330 of the housing 300 remains open, revealing the canister slot 335. In addition, screws (not shown) have been loosened to partially remove or lift off a portion of the front panel 310.

Figure 4A:
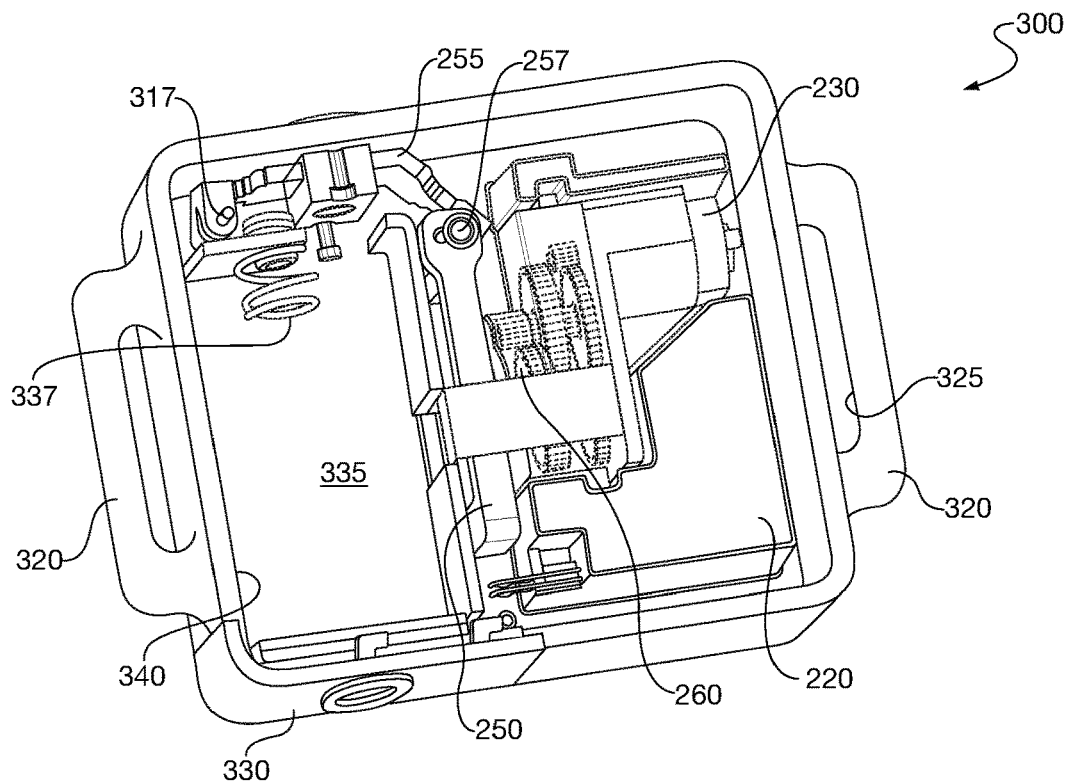
FIG. 4A is a perspective view of the housing of FIG. 3A, wherein a front panel has been removed to expose a pet spray training system of the present invention, in a first embodiment. The system includes an electric motor module, a gear assembly, an elongated motor arm and an actuation arm. The canister has been removed from the slot and is not visible.

FIG. 4A is a perspective view of the interior of the housing 300 of FIG. 3A. In this view, the front panel 310 has been completely removed to expose internal components of the pet spray system 200B. These components include an electric motor module 230, a gear assembly 260, an elongated motor arm 250 and an actuation arm 255. The canister 210B has been removed and is not visible. It is further observed in FIG. 4A that the access cover 330 is closed covering a canister slot 335.

Of interest from the view of FIG. 4A, a linking pin 257 is visible. As explained more fully in connection with FIG. 4C, the linking pin 257 enables a pivoting connection between the upper end 254 of the elongated motor arm 250 and the proximal end 251 of the actuation arm 255. At the same time, the distal end 259 of the actuation arm 255 is pinned to the housing 300 through pin 317.

The gear assembly 260 may include more than one gear, at least in this arrangement. Thus, rotation of the shaft 235 causes a progression of engaged gears to turn, ultimately moving the elongated motor arm 250 to move linearly.

Figure 4C:
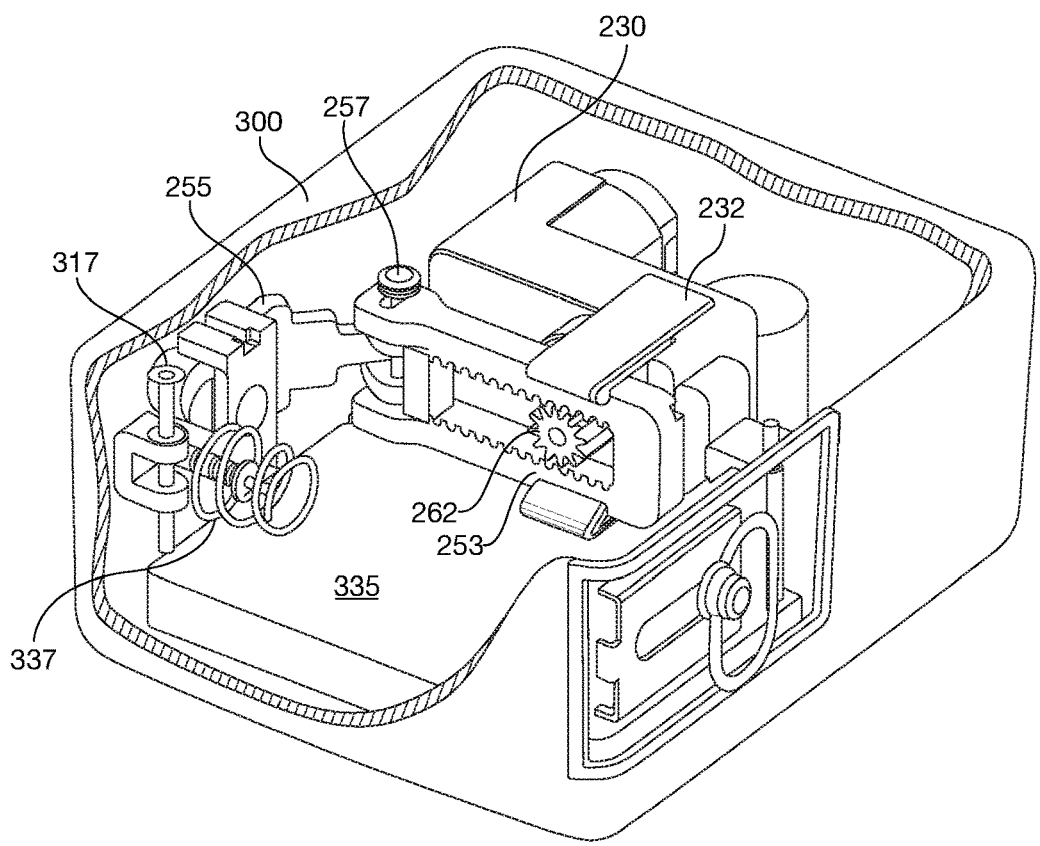
FIG. 4C is another perspective view of the housing of FIG. 3A. Here, the housing is cut-away, exposing the pet spray training system of FIGS. 4A and 4B.
Figure 4B:
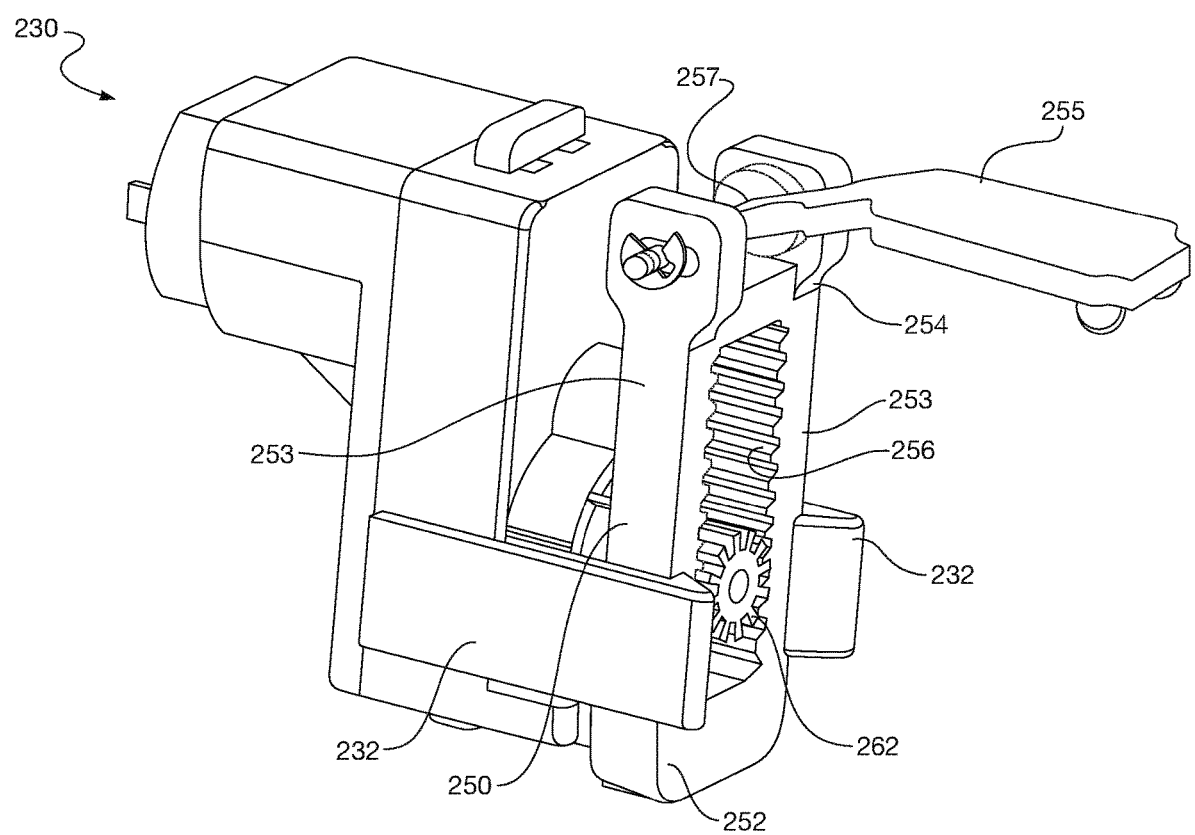
FIG. 4B is an enlarged perspective view of the electric motor module of the pet spray training system of FIG. 4A, in one embodiment. The electric motor module, elongated motor arm and gear assembly are visible as well.

FIG. 4B is an enlarged perspective view of the electric motor module 230 of the pet spray training system 300 of FIG. 4A, in one embodiment. The motor arm 250 is visible along with the last or ultimate gear 262. The gear 262 engages the elongated motor arm 250. The motor arm 250 is held in place relative to the motor module 230 by means of opposing clips 232. The clips 232 secure the arm 250 laterally, but permit linear movement in the up and down directions depending on rotational direction of the shaft 235 and gear 262. Alternatively, continued rotation of the gear 262 in the same angular direction will cause the linear direction of movement of the elongated motor arm 250 to reverse in accordance with operation of a rack-and-pinion assembly.

It is noted that in this arrangement, the elongated motor arm 250 comprises two opposing legs 253. The legs 253 come together to form the lower end 252 and the upper end 254 of the arm 250. The linking pin 257 is seen at the upper end 254 of each leg 253. It is further observed that internal surfaces of the legs 253 have gear surfaces 256. The gear surfaces 256 define teeth that receive the engaging gear 262 of the gear assembly 260. As such, the gear arrangement or assembly including the motor arm 250 is of a rack and pinion type arrangement.

FIG. 4C provides an enlarged perspective view of the housing of FIG. 4A. Here, the housing 300 is cut-away, exposing parts of the pet spray training system 200B of FIG. 2B. The spring 337 is seen positioned within the canister slot 335. The spring is configured to apply a biasing force upon the canister 210B to maintain its proper position and to insure proper actuation of the actuation arm 255 upon the nozzle 215.

The pet spray training system 200B relies upon an elongated pivoting actuation arm 255 that is momentarily pulled downward by the motor arm 250. This pulling action momentarily depresses the nozzle shoulder 212 (seen in FIG. 2B) associated with the canister 210B. The motor arm 250, in turn, is driven linearly (up and down) by a rack-and-pinion type arrangement driven by gears 260 (seen best in FIG. 4A). When the motor arm 250 travels downward, the actuation arm 255 pivots downward upon the nozzle shoulder 212, causing behavior modification fluid under pressure within the canister 210B to be expelled through the opening 311. When the motor arm 250 returns to its upward position, the actuation arm 255 pivots back upward, thereby releasing the nozzle 212 and shutting off the pressurized release of fluid.

It is observed that the same result, that is, momentary depression of the nozzle shoulder 212, may be accomplished by substituting the motor arm 250 and the actuation arm 255 with a rotating cam. In this embodiment, the rotating cam has a sinusoidal surface that acts against a transverse actuation arm. Thus, a rotational movement generated by a shaft again produces a linear movement that acts upon the nozzle shoulder 212.

Figure 5A:
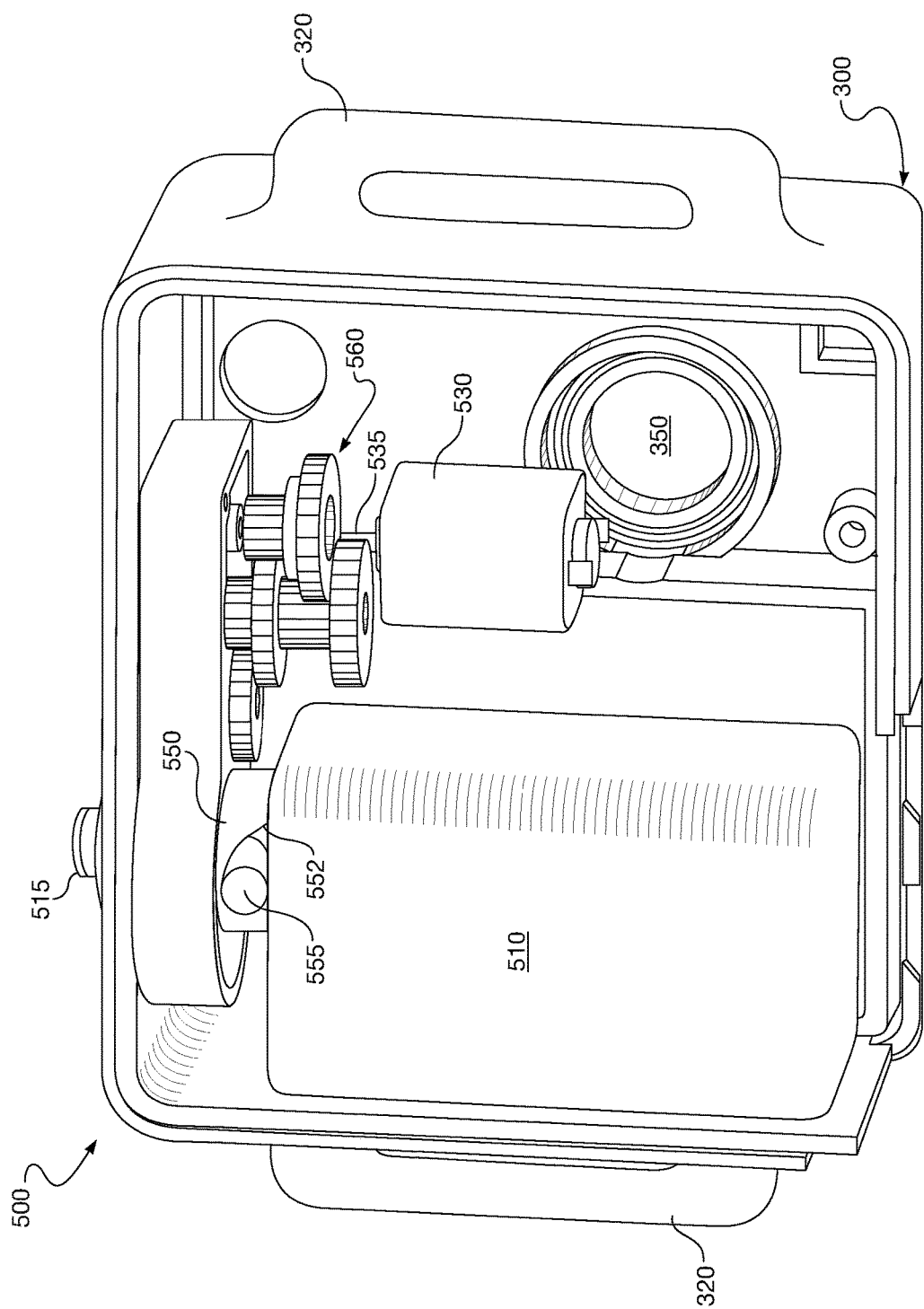
FIG. 5A is a perspective view of the housing of FIG. 3A, wherein a front panel has again been removed to expose a pet spray training system of the present invention, but in a second embodiment. The system includes an electric motor module, a gear assembly, a cam and an actuation arm. A canister is also visible here.
Figure 5B:
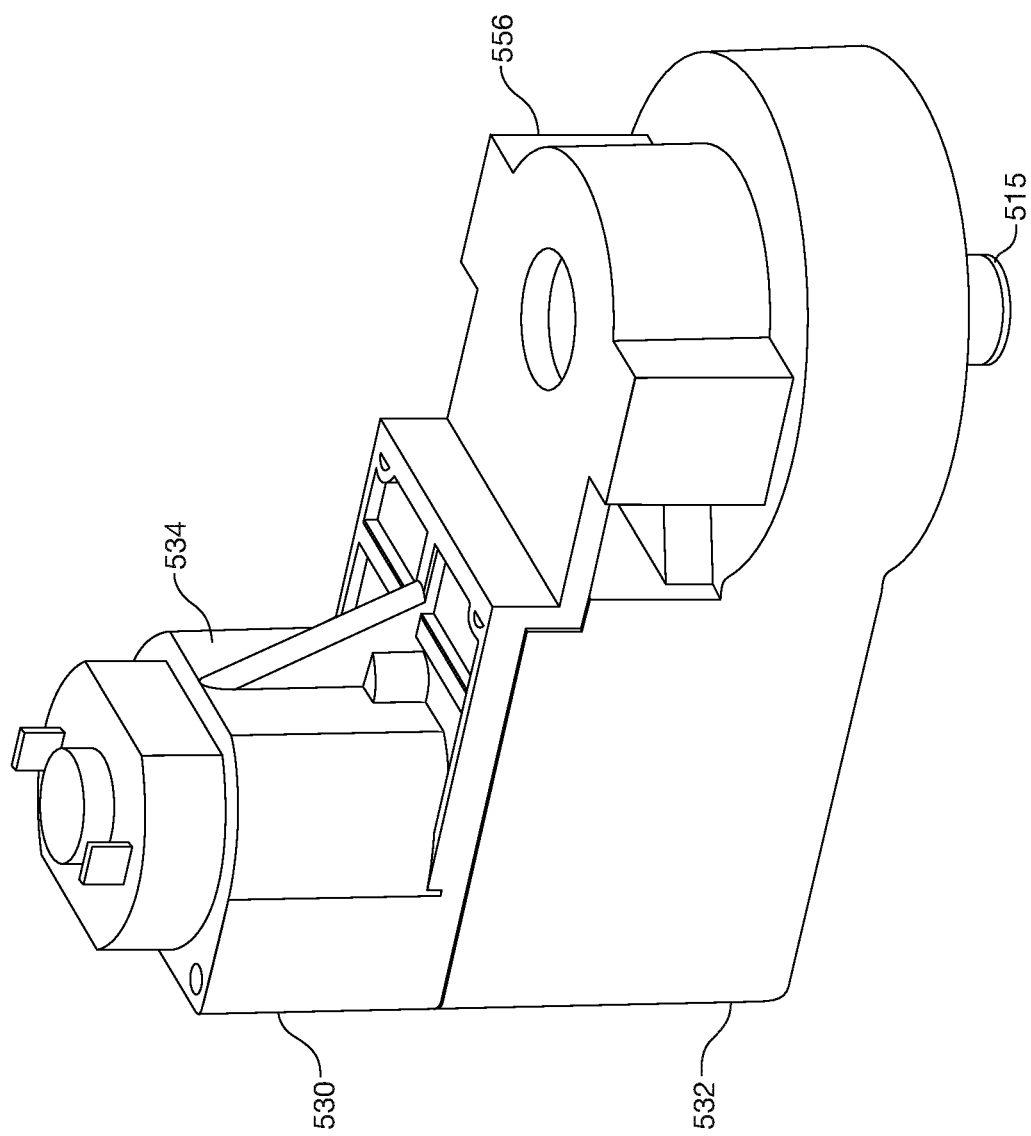
FIG. 5B is an enlarged perspective view of the electric motor module of FIG. 5A.
Figure 5C:
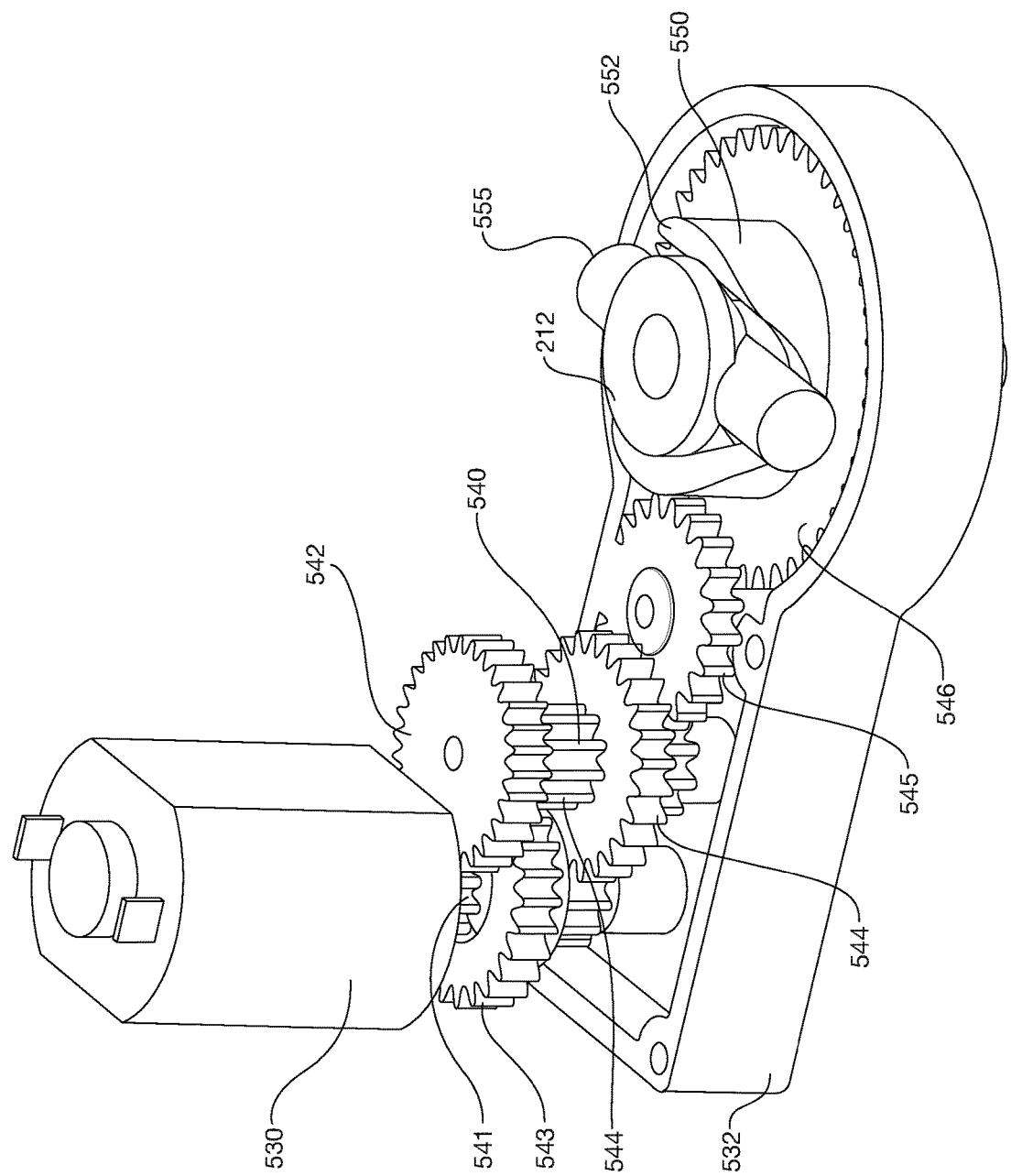
FIG. 5C is another enlarged perspective view of the electric motor module of FIG. 5A. Here, a portion of the housing of the module is removed, exposing the internal gears of the gear assembly.

FIGS. 5A through 5C present a pet spray training system (or an pet spray training system 500) in this alternate embodiment. In this respect, a cam 550 is provided having a cam surface 552. In addition, a transverse actuation arm 555 is employed to act against a spray nozzle 515.

FIG. 5A is a perspective view of the housing 300 of FIG. 3A, wherein a front panel 310 has again been removed. The pet spray training system 500 (as an pet spray training system) is seen therein. Visible in FIG. 5A is an electric motor module 530. The electric motor module 530 operates off of battery power to drive a shaft 535. The electric motor module includes a gear housing (seen at 532 in FIG. 5B) and a motor housing 534.

Figure 5D:
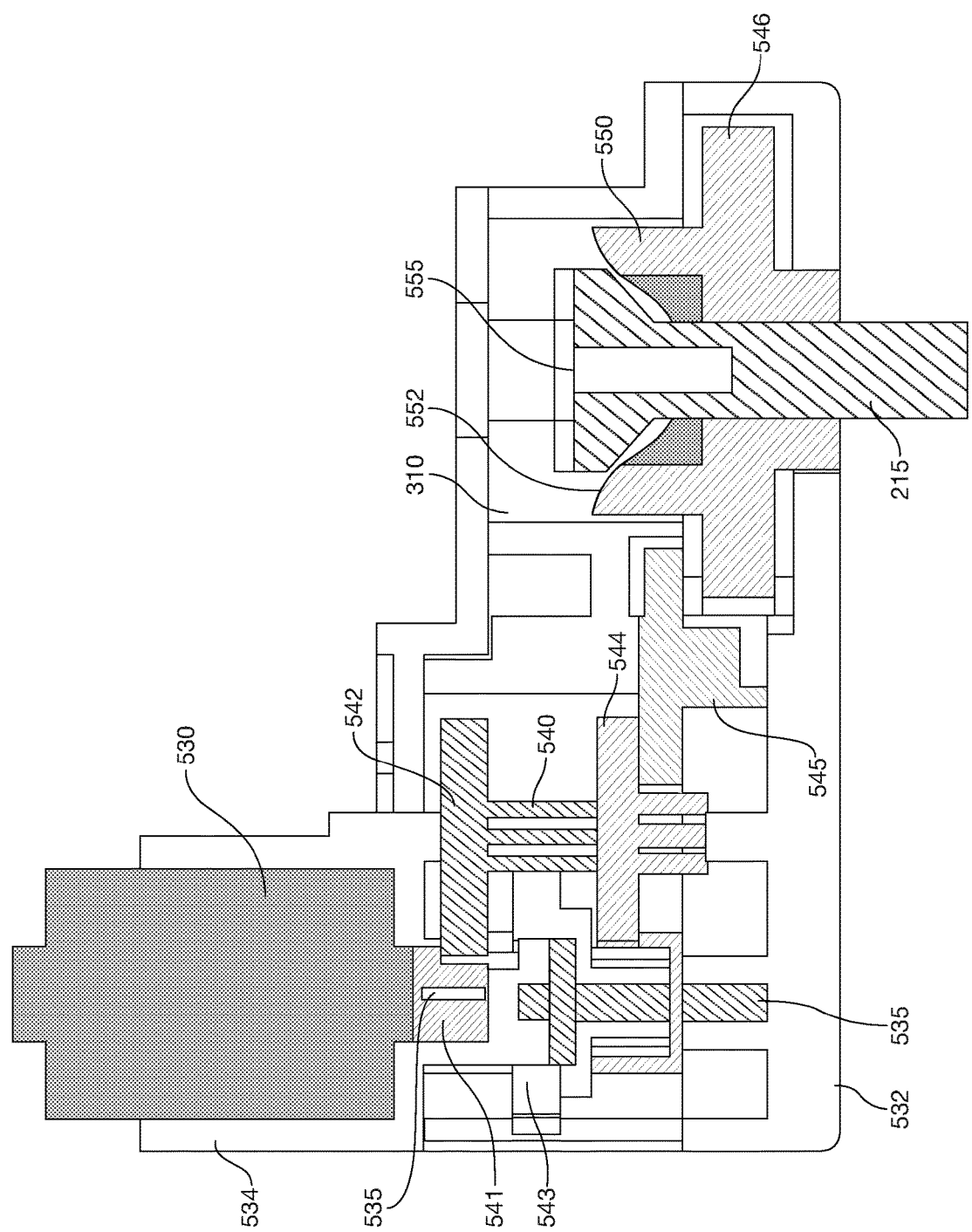
FIG. 5D is a cross-sectional view of the electric motor module of FIG. 5A. Selected gears are also seen in cross-section, along with the drive shaft and cam.

FIG. 5B is an enlarged perspective view of the electric motor module 530 of FIG. 5A. Gear housing 532 and module wall 556 are shown. FIG. 5C is another enlarged perspective view of the electric motor module 530 of FIG. 5A. Here, the module wall 556 is removed, exposing the gears of a gear assembly 560. FIG. 5D is a cross-sectional view of the electric motor module of FIG. 5A. Selected gears are seen in cross-section, along with the drive shaft 535 and cam 550.

Referring to FIGS. 5B, 5C and 5D together, the shaft 535 turns a gear, which is part of the gear assembly 560. The gears within the gear assembly 560 have respective shafts anchored within a gear housing 532. As the shaft 535 is turned, the progression of gears within the gear assembly 560 are rotated. In the illustrative arrangement of the system 500, the progression of gears represent a first gear 541, a second gear 542, a third gear 543, a fourth gear 544, a fifth gear 545 and a sixth gear 546. The first gear 541 and the third gear 543 are connected by the drive shaft 535, while the second gear 542 and the fourth gear 544 are connected by a separate geared shaft 540. It is understood that the present invention is not limited by the number or arrangement of gears used unless expressly so stated in the claims.

In the arrangement of FIG. 5D, the sixth gear 546 is integral to the cam body 550. Thus, as the gear 546 turns, the cam body 550 is also turned 550. The cam body 550 has a cam surface 552. The cam surface 552 has a sinusoidal profile. An actuation arm 555 resides along the cam surface 552, but is connected to the canister 210B. Those of ordinary skill in the intuitive arts will understand that as the cam 550 rotates with its cam surface 552, the actuation arm 555 will be cyclically depressed and released. Depression of the actuating arm 555 causes the shoulder 212 of the canister 210B to be depressed, momentarily releasing pressurized behavior modification fluid through the nozzle 215.

Based on the above description of the pet spray training system 100 and electric motor modules 230, 530, methods for modifying the behavior of an animal is offered herein. In one embodiment, a method first includes providing a spray training system. The spray training system may be arranged in accordance with any of the embodiments described above. Of interest, the spray training system will have a canister containing a pre-pressurized fluid. The spray training system also includes an electrical motor module configured to cause the pre-pressurized fluid to be released from the canister in response to an electrical signal from a signal filter and processor (120, 130 and/or 140).

The electric motor module comprises a drive shaft, and then one or more gears making up a gear assembly. Rotation of the shaft induces a turning of the gears within a gear assembly, which ultimately converts rotational movement into a linear movement. The linear movement produces a momentary downward force to a shoulder associated with a spray nozzle on the canister.

In one embodiment, the linear movement is produced in a motor arm. The motor arm, in turn, causes a pivoting actuation arm to depress the spray nozzle associated with the canister. This briefly releases a bark deterrent fluid from the canister. Thereafter, the motor module reverses the rotational direction of the shaft, causing the elongated motor arm to reverse linear course and to return to its original position. This, in turn, pivots the actuation arm back to its resting position, wherein the spray nozzle is closed and bark deterrent fluid is no longer released. Alternatively, the reversal of the motor module may be accomplished through the contact and actuation of an electric switch positioned in the path of the moving actuation arm. Alternatively still, the elongated arm is returned to its original position by continuing to rotate the last gear 262 in accordance with a rack-and-pinion arrangement.

In another embodiment, the linear movement is produced by means of a cam body having a cam surface. Rotation of the cam surface against a transverse actuation arm associated with the spray nozzle causes a cyclical depression of the nozzle. Note that this is not a pumping action.

The method next includes securing the pet spray training system 100 to a collar. As noted above, a collar is shown at 600, affixed to a dog 650. Securing the system 100 to a collar 600 of a dog 650 preferably comprises connecting the housing 300 to the collar 600. The system 100 is positioned so that as the stream of bark deterrent fluid is released from the spray nozzle 166, the fluid affects the dog's senses, such as smell. Of course, the collar 600 may represent a harness as well.

In one aspect, the bark deterrent fluid comprises a solution that is offensive to one or more senses of a dog. For example, the fluid may contain a component that presents an offensive smell. In another example, the fluid contains a component that temporarily stimulates the dog's senses of smell, hearing or touch. For example, the stimulant may be a deterrent fluid that mildly irritates the dog's eyes or nose.

In one aspect, the pet spray training system 100 further comprises a speaker 610. The speaker 610 is configured to emit a sound that emulates a spray of fluid. The sound is emitted in response to conditioned electrical signals from the signal conditioning 130 indicative of the bark of a dog. In this instance, the sense will be the sense of hearing.

In one embodiment, the method also includes removing a first canister 162 from the fluid intake when the bark deterrent fluid is substantially exhausted, and then replacing the canister with a second canister having also a bark deterrent fluid.

In one embodiment, the method further comprises adjusting the spray nozzle. Adjusting the spray nozzle may mean adjusting the nozzle to create a fine mist or, alternatively, a heavy fluid stream of the bark deterrent fluid.

In one aspect, the pet spray training system 100 further comprises a remote transmitter (seen in FIG. 1 at 150) The remote transmitter 150 is configured to send a wireless activation signal in response to manual actuation by a trainer or pet owner. The signal is sent to a receiver 155 associated with the system 100.

Figure 6:
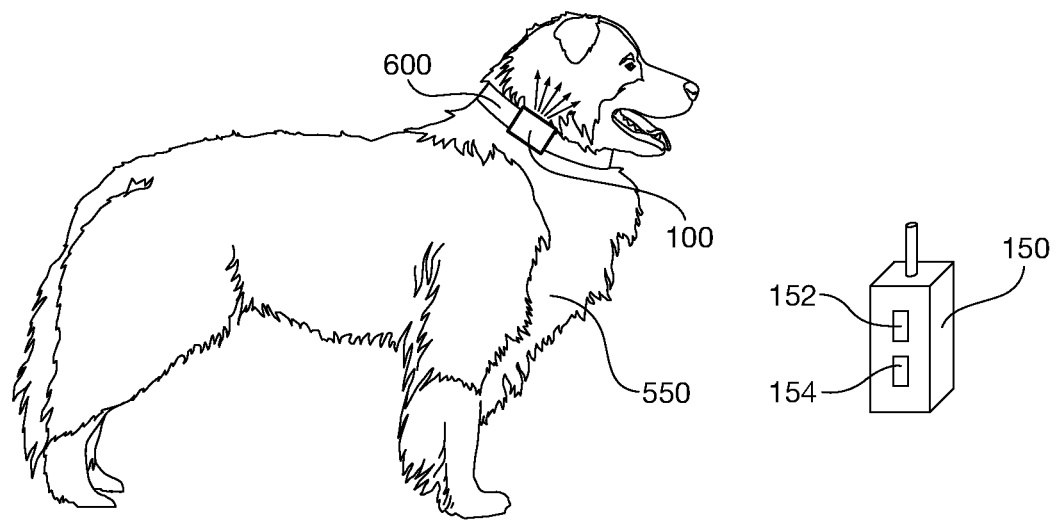
FIG. 6 is a schematic view of the pet spray training system of FIG. 1, shown with a pet dog and affixed to a pet dog collar. The system is within the housing of FIG. 3A.

FIG. 6 illustrates use of the pet spray training system 100 of FIG. 1, with a remote transmitter. The remote transmitter 150 is intended to be held and used by an owner or trainer (not shown). In this arrangement, the system 100 is shown secured to a collar 600 placed around the neck of a dog 650.

In this instance, the system 100 will further include the receiver 155 configured to receive wireless activation signals sent manually by the operator of the remote transmitter 150, and in response generate an electrical behavior modification signal. The signal activates the motor module 164, which in turn activates the actuation arm that then releases pressurized fluid from the first canister 162. This, in turn, causes a stream of the bark deterrent fluid to be released through the spray valve 166 and through the opening 515.

Button 152 is shown in FIG. 6, indicating a button 152 that may be pushed by the pet owner or trainer to manually and remotely actuate the motor module 164. Pushing button 152 sends a bark deterrent signal, which ultimately causes the canister 162 to emit the deterrent spray through the valve 166 and the through-opening 515.

In one embodiment, the pet spray training system 100 further comprises a second canister 168. The second canister 168 contains a behavior reinforcement fluid. The behavior reinforcement fluid comprises a solution or otherwise contains a component that is pleasing to a dog's sense of smell.

The first canister 162 is removed from the housing 300, and the second canister 168 is installed in the slot 335.

In this instance, the system 100 may again include a remote transmitter 150 configured to send a wireless activation signal in response to manual actuation, and a receiver 155 configured to receive the wireless activation signal. Here, the wireless activation signal is a behavior reinforcement signal. Pushing button 154 sends a behavior reinforcement signal, which ultimately causes the spray mechanism 160 to emit the reinforcement spray through the nozzle or valve 166.

In response to the signal, an electrical behavior modification signal is sent to the motor module 164. Here, the electrical motor 164 is configured to operate for a time to depress the spray nozzle 166 and to release fluid pressurized from the second canister 168. This, in turn, causes a stream of the behavior reinforcement fluid to be released through the spray nozzle 166.

In one arrangement, each of the canisters (or tanks) 162, 168 is fabricated from a bio-degradable material, such as a bioplastic. Examples include cellulose esters, polybutylene succinate (PBS), polyanhydrides, polyhydroxyalkanoates (PHA's), lignin based plastics and polylactic acid (PLA).

Variations of the method for modifying the behavior of an animal using a behavior modification system may fall within the spirit of the claims, below. For example, in one embodiment the pet training system may be set up as two different components, with one component housing the tank(s) 162, 168 and associated motor module 164, and another component housing the sound detection device and associated signal processing circuitry.

Figure 7:
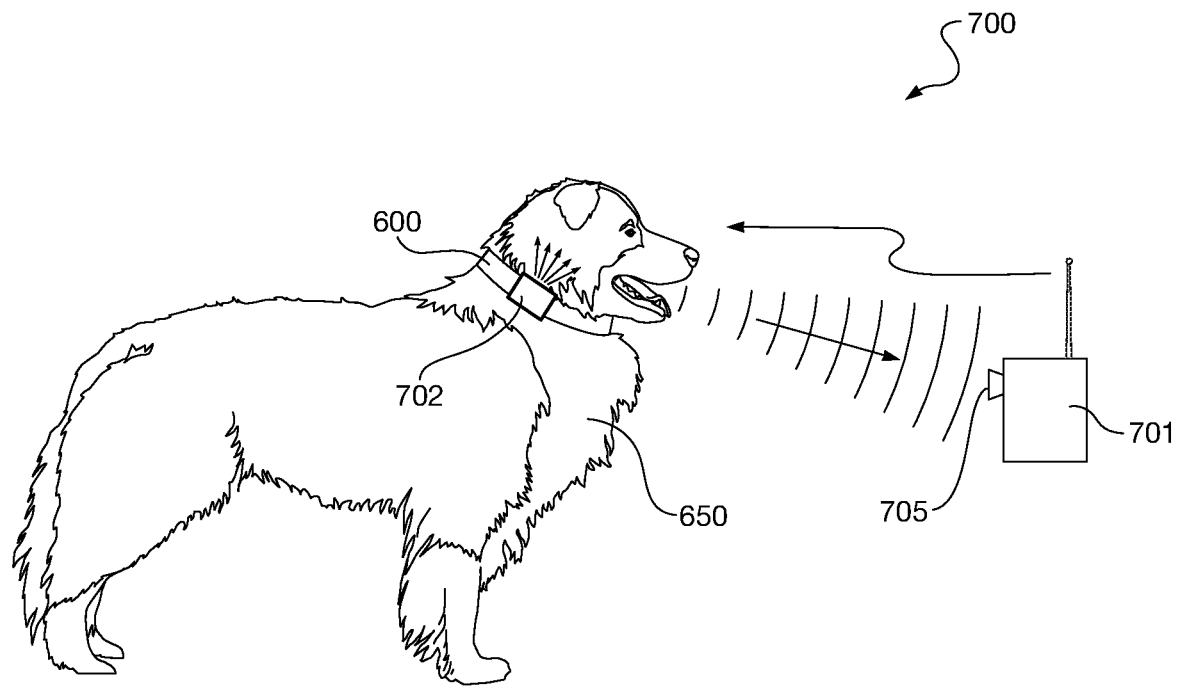
FIG. 7 is a schematic view of the pet spray training system of FIG. 1, shown with a pet dog and affixed to a pet dog collar.

FIG. 7 illustrates a pet training system 700 in such an alternative embodiment. Here, the pet training system 700 includes a remote transmitter 701 housed separately and apart from the collar mounted spray system 702. The remote transmitter 701 includes a sound detector 705, in the form of a microphone. The remote transmitter 701 is configured to send a wireless activation signal in response to the detection of recognized frequencies characteristic of the bark of a dog or other designated sound. The wireless activation signal is received by the collar mounted spray system 702, which then automatically actuates the electrical motor 164 to release fluid from the canister 162. This, in turn, causes a stream of the bark deterrent fluid to be automatically released through the spray nozzle 166. Thus, a person does not have to be present to active the remote transmitter 701. Accordingly, the remote transmitter may be placed in an area wherein the dog is taught not to bark such as a bedroom, office or nursery. At the same time, the dog's bark does not activate the system should the barking occur outside the range of the remote transmitter.

Figure 8:
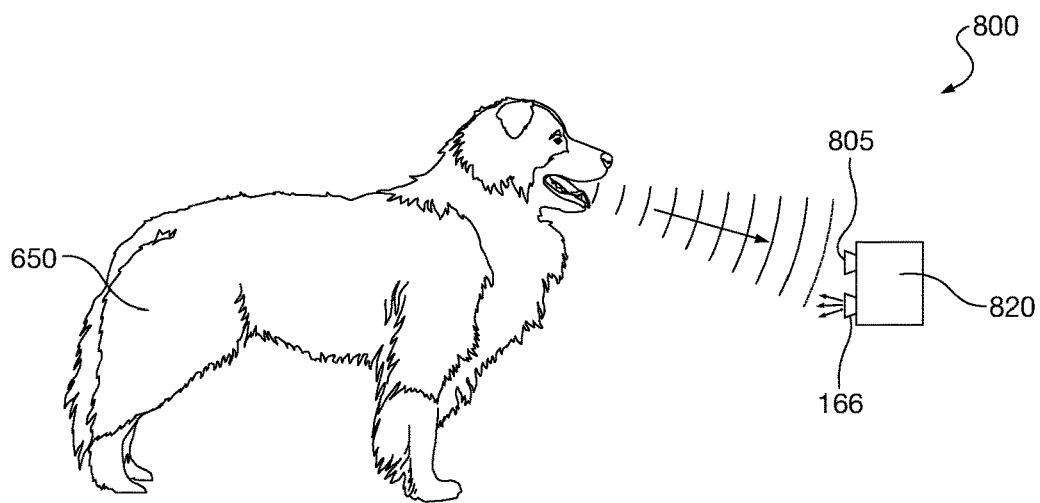
FIG. 8 is a schematic view of the pet spray training system of FIG. 1, shown with a pet dog.

In a related arrangement, all components of the pet spray training system are housed in a single remote housing that is apart from an animal collar. FIG. 8 illustrates a pet training system 800 in such an alternative embodiment. The pet training system 800 is separate and apart from the pet 650 to be trained and is therefore referenced herein as stationary or free-standing even though it may be moved to different locations.

The system 800 is similar to the previously disclosed system 700 except that it is not coupled to a collar worn by the pet 650. This is ideal for pets who do not wear a collar. Here, the system 800 includes a sound detector 805 in the form of a microphone and filter. The microphone 805 is configured to send an activation signal in response to the detection of recognized frequencies characteristic of the bark of a dog or other designated sound. The activation signal automatically actuates the electrical motor 164 to depress a spray nozzle 166 associated with the canister 162. This, in turn, causes a stream of the pressurized bark deterrent fluid to be automatically released through the spray nozzle 166. Thus, a person does not have to be present to activate the system 800.

The system 800 may be placed in an area wherein the dog is taught not to bark. Examples again include a nursery or a bedroom. Other examples include a kitchen, an office, a dining room or at the front door. The dog's bark does not activate the system should the barking occur outside the range of the microphone 805. In the arrangement for the system 800, components are all held within a single housing 820.

Figure 9:
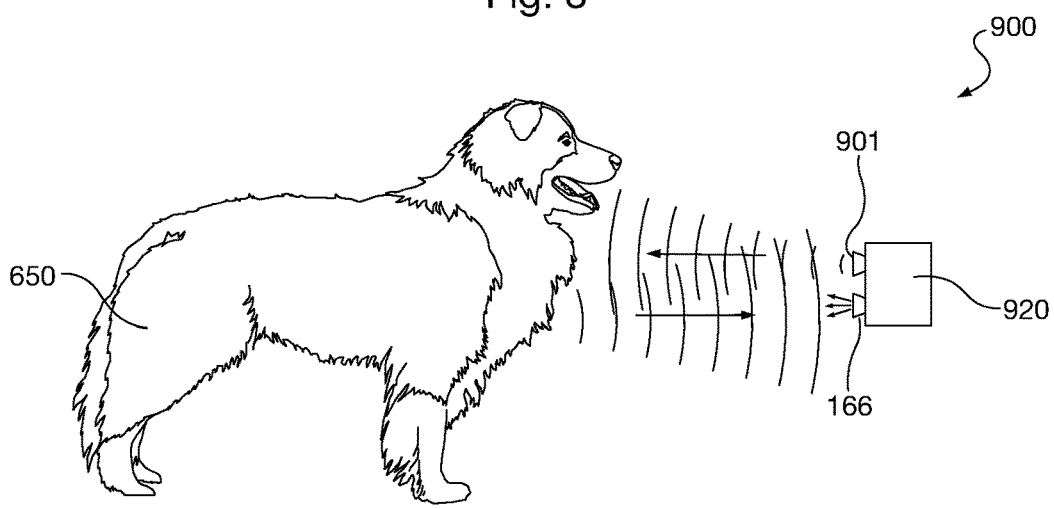
FIG. 9 is a schematic view of the pet spray training system of FIG. 1, shown with a pet dog.
Figure 10:
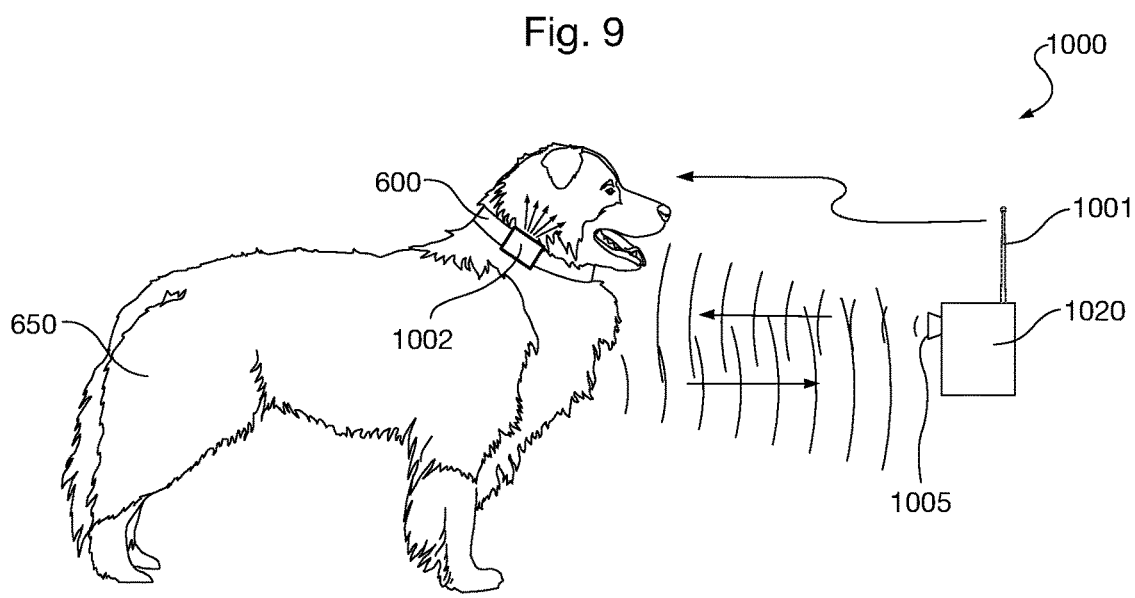
FIG. 10 is a schematic view of the pet spray training system of FIG. 1, shown with a pet dog and affixed to a pet dog collar.

In another embodiment, an pet spray training system in the form of a spray trainer may be used to deter a pet from entering an area. The area may be, for example, a bed, a couch, a kitchen, a table top or an item of furniture. FIGS. 9 and 10 demonstrate embodiments of such spray training systems.

First, FIG. 9 illustrates another pet training system 900 wherein the training system 900 is separate and apart from the pet 650 to be trained. Such a system is similar to system 800 of FIG. 7 in that it is portable and free-standing. In this instance, again, the pet 650 need not wear a collar. The system 900 may be moved from room-to-room or even packed and taken with the owner in a car to a new location.

Instead of a sound detection system, the system 900 includes a motion sensor 901. The motion sensor 901 is configured to sense the proximity of the pet 650. The system again includes a housing 920 to which the motion sensor 901 is mounted. The motion sensor 901 sends an activation signal in response to the detection of animal movement in the area of the system. The system 100 of FIG. 1 demonstrating a sensor 110 along with an optional amplifier 120, signal conditioner 130 and processor 140 is applicable to a motion sensor and its resulting electrical signal.

The system also includes a canister 162. The canister 162 is again configured to hold a deterrent fluid at positive pressure. The deterrent fluid may include a fragrance or chemical that is offensive to one or more senses of the pet. The canister 162 is further configured to reside on a surface, such as a table or a counter. In this embodiment, the system is not secured to the animal itself by means of a collar; rather, the system is free-standing and resides in the area from which the pet 650 is to be deterred from entering.

The system additionally includes a motor module and a gear assembly as previously described. The motor module 164 is electrically coupled to the motion sensor 110 and is in fluid communication with the canister. The motor module 164 depresses a spray nozzle 166 associated with a canister 162 for releasing, or discharging, a stream of the deterrent fluid in response to the electrical signals.

Ideally, the system 900 is placed in an area wherein the dog 650 is taught not to enter, while the dog's movement does not activate the system 900 outside the range of the motion detector 901. In this manner, the dog 650 is taught not to enter select areas of a home or other space.

FIG. 10 illustrates a pet training system 1000 in a related alternative embodiment. Here, the system 1000 again includes a motion detector 1005. The pet training system 1000 also includes a remote transmitter 1001. The motion detector 1005 and the transmitter 1001 are housed separately and apart from the collar 600 with the mounted spray system 1002. A housing for the motion detector 1005 and the transmitter 1001 is shown at 1020.

In operation, the remote transmitter 1001 sends a wireless activation signal in response to the detection of pet movement by the motion sensor 1005. The wireless activation signal is received by the collar mounted spray system 1002 which then automatically actuates the electrical motor to activate a motor module 164 for a period of time and cause a spray nozzle 166 associated with the canister 162 to be depressed. The period of time may be, for example, 1 to 5 seconds, or 2 to 3 seconds. This, in turn, causes an emission of the deterrent fluid through the spray nozzle 166 associated with the collar 600. Thus, a person does not have to be present to active the remote transmitter 1001. Accordingly, the remote transmitter may be placed in an area wherein the dog is taught not to enter, while the dog's movement does not activate the system 1002 should the movement occur outside the range of the remote transmitter 1001. In this manner, the dog 650 is taught not to enter only select areas of a home.

In one aspect of the pet training system 1000, either the housing 1020 or the collar 600 includes a speaker (shown at 610 in FIG. 1). The speaker 610 may emit ultrasonic sound waves audible only to the dog 650. The sound waves serve as a bark deterrent. Alternatively, the speaker 610 simulates the sound of the spray nozzle to elicit a Pavlovian stopping of the barking.

Figure 11:
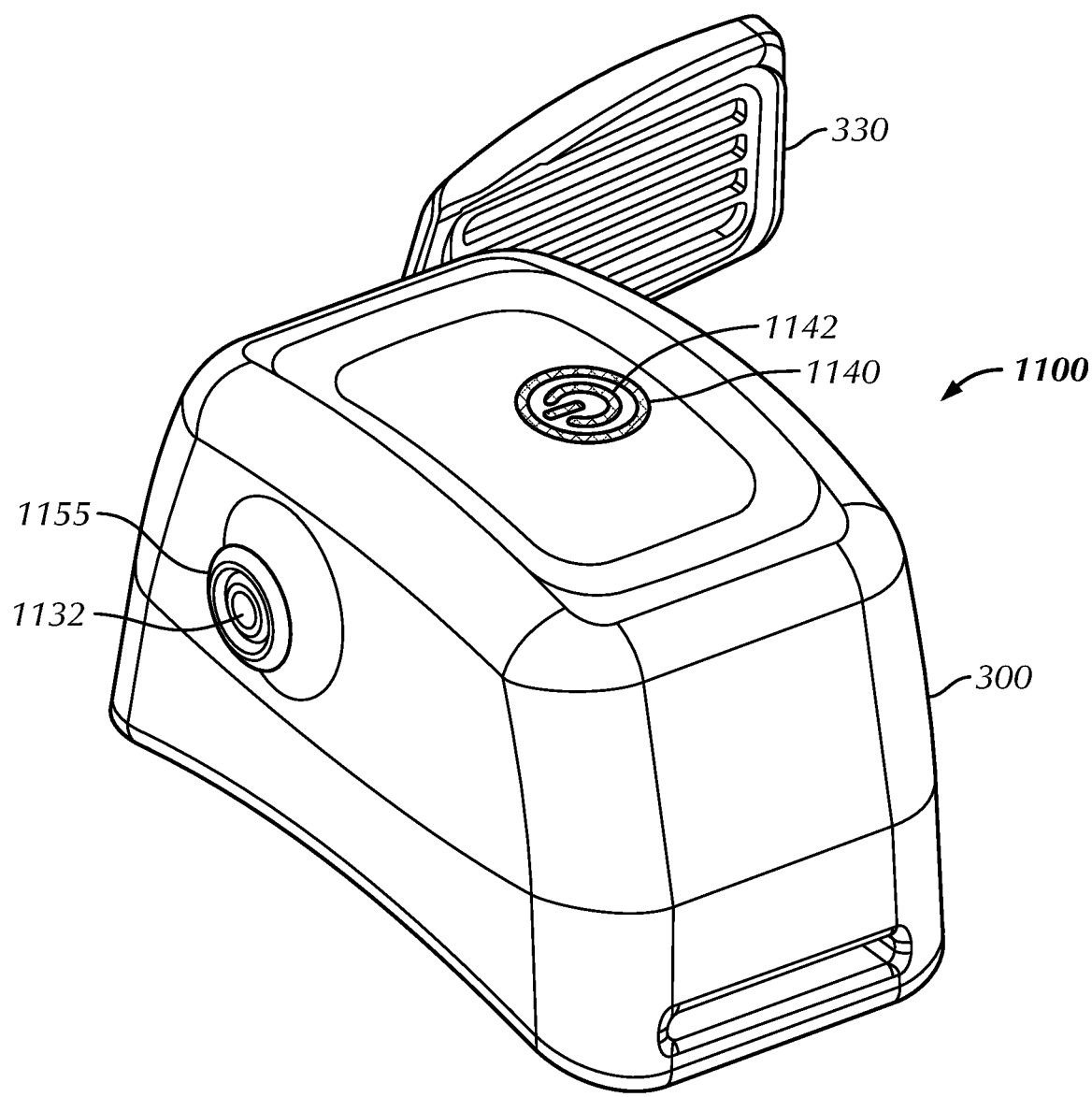
FIG. 11 is a perspective view of an pet spray training system of the present invention, in another embodiment.

FIG. 11 illustrates the pet spray training system 1100 in a form of the present invention. The pet training system 1100 is intended to reside on the collar placed upon a dog or as a stand-alone structure.

Figure 12:
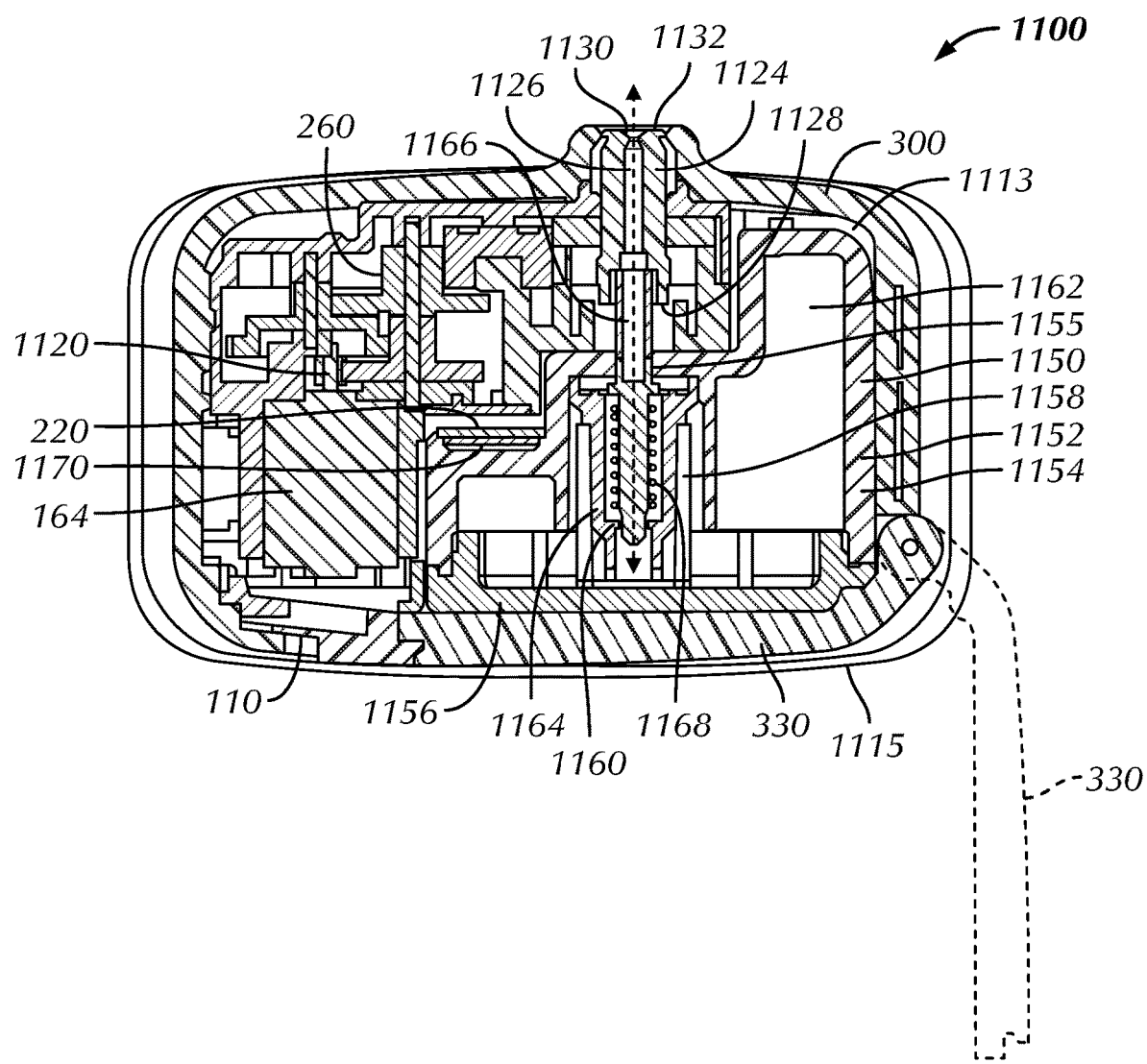
FIG. 12 is a cross-sectional view of the pet spray training system of FIG. 11.
Figure 13:
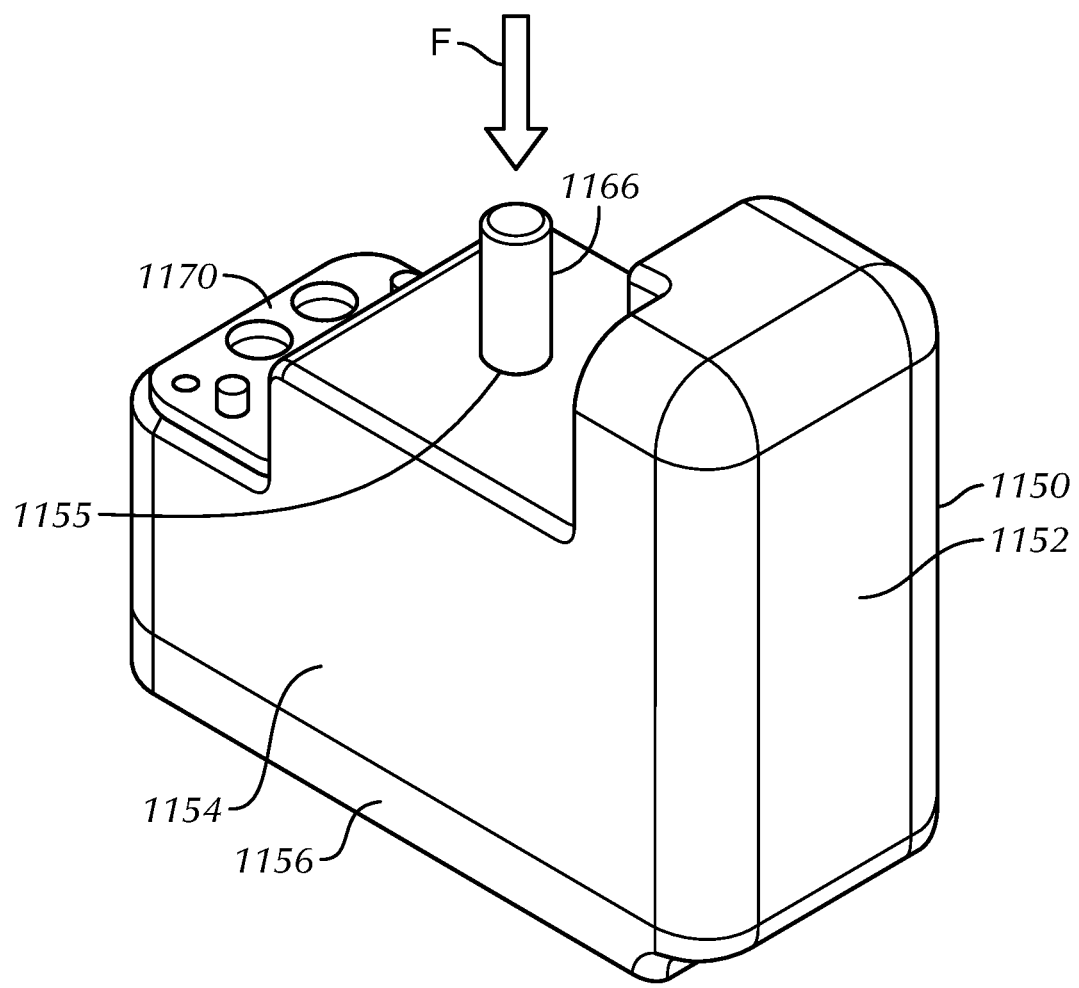
FIG. 13 is a perspective view of the removable reservoir portion of the pet spray training system of FIG. 11.
Figure 14:
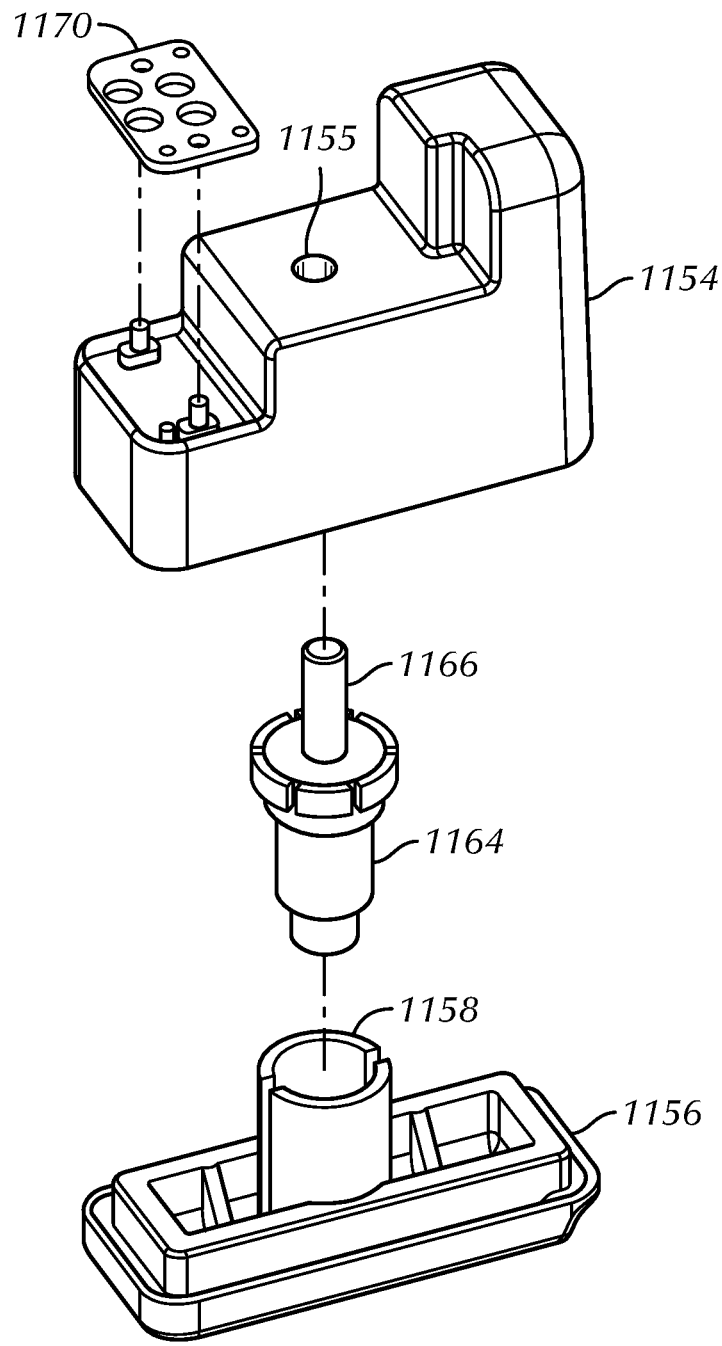
FIG. 14 is an exploded view of the removable reservoir portion of the pet spray training system of FIG. 11.
Figure 15:
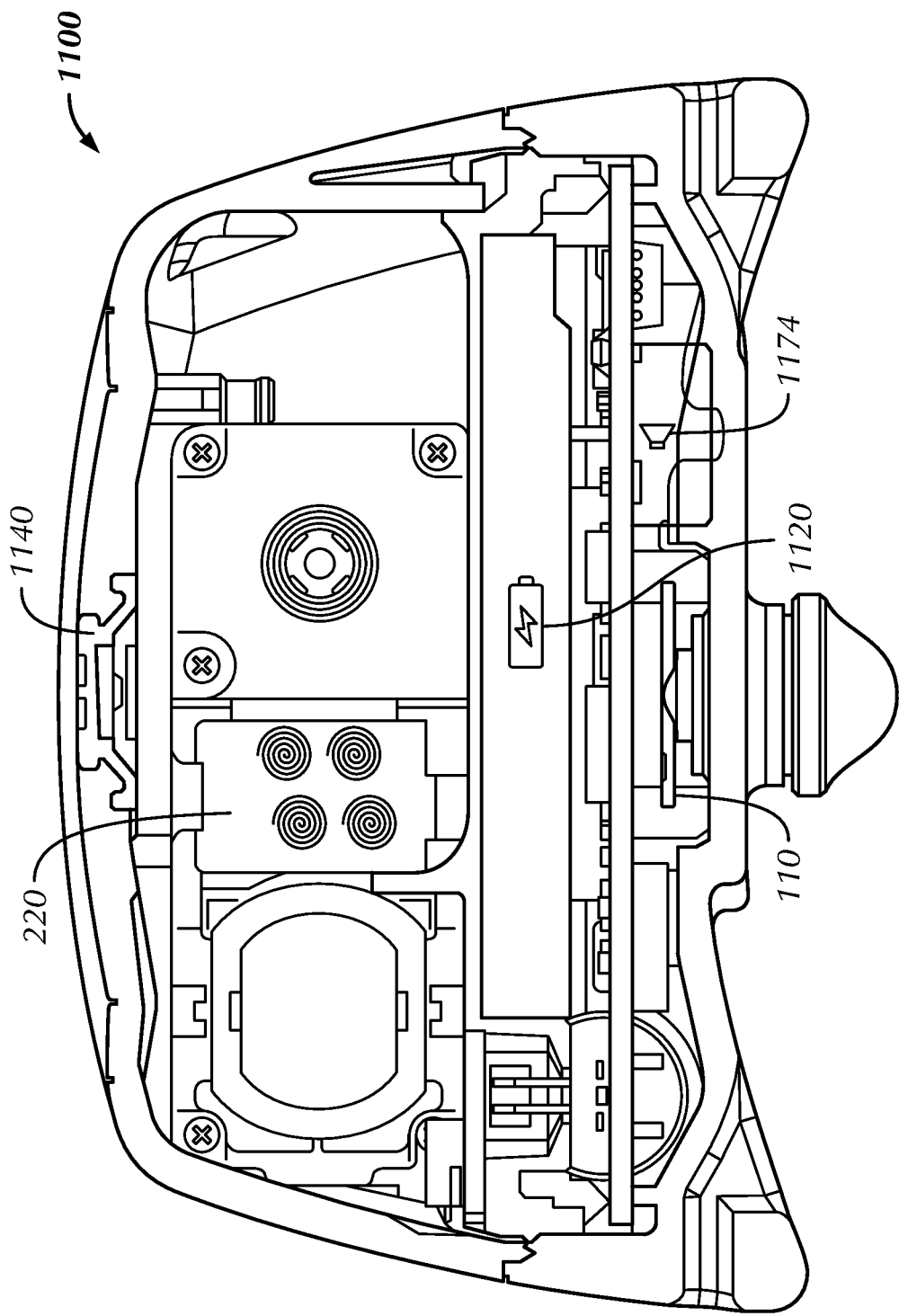
FIG. 15 is a cross-sectional view of the pet spray training system of FIG. 11.

The pet spray training system 1100 has an external housing or receiver 300 that partially defines an interior holding compartment or chamber 1113. The housing 300 has a pivotal cover or door 330 which opens to expose the interior holding chamber 1113 through a canister opening 1115 and closes to enclose the interior holding chamber 1113, as shown in FIG. 12.

Figure 16:
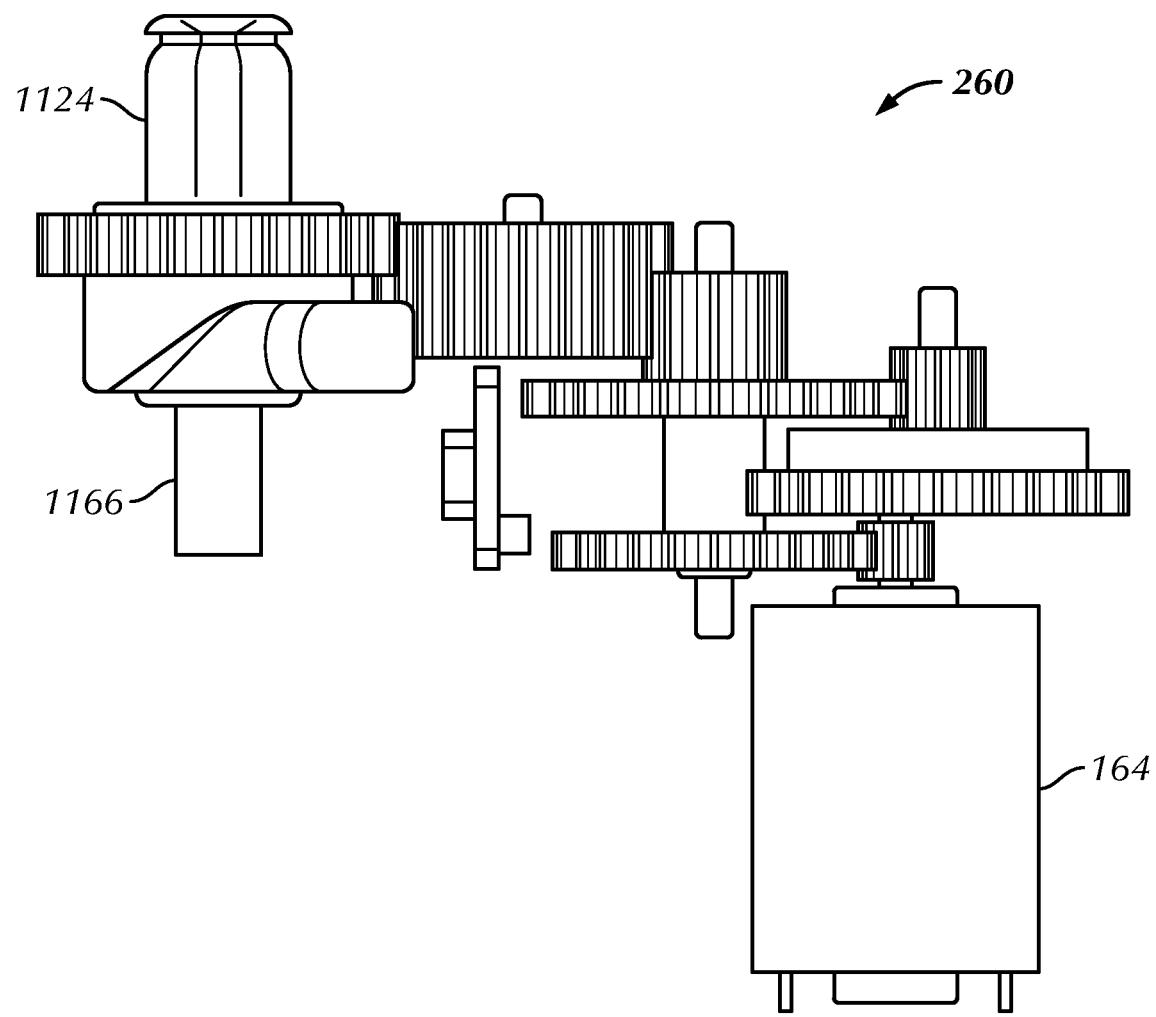
FIG. 16 is a side view of the gear assembly, motor and reservoir of the pet spray training system of FIG. 11.

The housing 300 houses a DC motor or motor module 164 and a DC battery 1120 which is electrically coupled to the motor 164. The motor 164 has a geared shaft 1120 which meshes with a series of gears or gear assembly 260. The gear assembly 260 and any ancillary structure coupled thereto may be considered to be a mechanical assembly, which may alternatively be configured in other conventionally known forms, such as those using levers, cams, gears or a combination of such. The gears 260 are mechanically coupled to a tubular plunger 1124 or alternatively previously described pivotal actuator arm or camming system including the final cam 1125 which is best shown in FIG. 16. The plunger 1124 is generally cylindrical with a central channel or passage 1126 extending from a lower end or opening 1128 to an upper end or opening 1130. The upper end 1130 is in the form of a spray nozzle 1132 to create a spray, mist or gas vapor.

The pet spray training system 1100 has an electric circuit 220 coupled to the motor 164 that includes a bark sensor 110 and an on/off switch 1140 which includes a light 1142 to indicate select conditional statuses, such as low gas condition, on condition, etc. The bark sensor 110 may be any system that is responsive to the bark of the dog. In one embodiment, the bark sensor 110 is a piezoelectric vibration sensor that is in contact with the dog for measuring vibrations produced by the dog. The piezoelectric sensor is a low current device used for detecting the barking of a dog. In one aspect, the bark sensor 110 is placed in contact with the throat of the dog so as to measure vibrations produced by the vocal cords of the dog. Such an embodiment is described in detail in U.S. Pat. No. 9,943,067 entitled "Pet Spray Training System"; and U.S. Pat. No. 6,668,760 entitled "Spray Control Anti-Bark Collar", the entirety of which is incorporated herein by reference in its entirety.

As an alternative, the bark sensor 110 is a microphone. The microphone is configured to receive sound frequencies emitted in proximity to the dog collar. In response, the microphone generates electrical signals.

The electrical signals are taken through a conditioning process, which may include amplification. The amplifier is coupled to the bark sensor 110 and amplifies the output of the vibration (or sound) bark sensor 110 to increase the level of the sensor output for further processing and more accurate sampling. The conditioned signal may be used to output a sound through a speaker 1174 as previously described.

The circuit 220 may also optionally include further signal conditioning of the output of the amplifier. The signal conditioning circuit serves to discriminate among the vibrations or sound frequencies measured by the bark sensor 110 so as to pass only measured vibrations or frequencies that meet specified criteria. For example, the signal conditioning circuit may be configured to filter out frequencies not indicative of the bark of a dog, or to pass only those vibrations occurring within a specified frequency range or those meeting certain durational limits. The signal conditioning circuit may be configured to remove unwanted components of the sensor output. Those skilled in the art will recognize the various filters, amplifiers and other signal conditioning devices that can be used to prepare the measured frequencies or vibrations for further processing. Those skilled in the art will also recognize that the type of signal conditioning depends upon the input signal, the corresponding sensor and the desired characteristics of the input signal that are to be monitored. For example, the signal conditioning or filter may be active or passive and may be set to pass a specific frequency range or to remove high or low frequency noise. Further, depending upon the various components used, the output signal may not require additional amplification. Finally, other conditioning may be required to present a useable sensor output to the remainder of the circuit.

The pet spray training system 1100 also includes a removable and replaceable pressurized gas reservoir 1150 which is configured to be received within the interior holding chamber 1113. The replaceable reservoir 1150 includes a reservoir housing 1152 having an upper portion 1154 and a lower portion 1156 welded to the upper portion 1154. The upper portion 1154 has a nozzle opening 1155 there through. The lower portion 1156 has a generally cylindrical valve mount 1158 configured to receive a valve assembly 1160 therein. The valve assembly 1160 is in fluid communication with a pressurized gas canister or canister portion 1162 positioned within the replaceable reservoir 1150 and containing a bark deterrent gas. Alternatively, the interior of the replaceable reservoir 1150 may be pressurized with the bark deterrent gas so that the replaceable reservoir does not require a separate canister.

The valve assembly 1160 has a generally cylindrical and tubular valve housing 1164 configured to receive a depressible, elongated nozzle 1166 which is biased upwardly, in reference to the drawings, by a spring 1168 mounted within the valve housing 1164. The elongated nozzle 1166 is configured to extend through nozzle opening 1155 in the reservoir housing upper portion 1154 and be received within the lower end 1128 of the central passage 1126 of the plunger 1124.

Lastly, the replaceable reservoir 1150 includes a circuitry in the form of a printed circuit board assembly (PCBA) 1170 coupled to the upper portion 1154 of the reservoir housing 1152. The PCBA 1170 may be coupled to the housing through deformable staked pins, or any other conventionally known mounting means. The PCBA 1170 has circuitry which accumulates and stores data which allows for the reservoir 1150 to monitor the current deterrent gas capacity in terms of the number of spray actuations and durations.

In use, the deterrent gas filled replaceable reservoir 1150 is positioned within the interior chamber 1113 with the nozzle 1166 positioned within the lower end 1128 of the plunger 1124, as best shown in FIG. 12. The door 330 is closed to maintain the position of the reservoir 1150.

Should the dog bark, the sensor 110 receives the vibration input or sound input and generates a signal to the circuit 130/220. In turn, the circuit 130 energizes the motor module 164 which actuates the gear assembly 260 to move the plunger 1124 linearly downwardly (axial force) against the nozzle 1166 through the movement of the cam 1125. The downward movement or depressing of the nozzle 1166 causes an actuation of the valve assembly 1160 which causes the release of bark deterrent gas from the canister portion 1115 upon reaching a predetermined trigger point to release the gas. The deterrent gas passes through the nozzle 1166 and through the central passage 1126 of the plunger 1124. The gas is emitted as a spray from the spray nozzle 1132 of the plunger 1124. The circuit 130 then reverses the process to cause the valve assembly 1160 to return the nozzle 1166 to its original position through the biasing force of spring 1168.

The circuit or PCBA 1170 records the actuation and duration of the deterrent spray through the actuation of the motor. The number of actuations and durations of the deterrent spray are maintained so that the PCBA 1170 can determine when the reservoir 1150 should be depleted of the deterrent gas and replaced. When the threshold limit or calculated depletion of deterrent gas is reached, the circuit may illuminate the indicator light 1142 (with a different color to differentiate an on condition from a low gas condition) or produce an audio signal to indicate the depletion through the speaker 1174.

To replace the reservoir 1150, a user simply opens the pivotal door 330 and removes the depleted reservoir 1150 from the interior chamber 1113 through canister opening 1115. A new, fully charged or gas filled reservoir 1150 may then be inserted into the interior chamber 1113. The new reservoir 1150 has a PCBA 1170 which starts the actuation count and duration over again.

It should be understood that the removable reservoir 1150 is a self-contained unit which is not intended to be rechargeable or refillable by a user, although the removable reservoir 1150 may be refilled at a manufacturer location or the like. The PCBA 1170 associated with each reservoir 1150 records the number of actuations and durations for purposes of determining when the reservoir 1150 is depleted. Therefore, the PCBA 1170 is not intended to be reset or reprogrammed by the user. This complete replacement of the reservoir 1150 maintains an accurate calculation of the deterrent gas. This also allows for a quick and easy replacement of the replaceable reservoir 1150 without the problems associated with manually refilling the reservoir with a deterrent gas.

The pet spray training system 1100 may also, as an alternative, be controlled through a wireless receiver 155 and transmitter 150, as previously described. As such, the pet training system 1100 may or may not include the bark sensor, as controlled release of the spray from the pressurized gas reservoir 1150 may be controlled remotely through the use of the wireless receiver 155 and transmitter 150 rather than, or in addition to, the actual sensing of a bark.

An pet spray training system 1100 of an embodiment is comprising an external housing defining a gas reservoir holding chamber 1113, a sound sensor 110, an electrical circuit 130 electrically coupled to the sound sensor 110 which processes electrical output signals to determine whether the sound sensor 110 has sensed the bark of a dog, a motor 164 electrically coupled to the electrical circuit 130, a battery 1120 electrically coupled to the motor 164, and a gear assembly 260 coupled to the motor 164. The pet spray training system 1100 also includes a pressurized gas reservoir 1150 containing a bark deterrent fluid under pressure, the pressurized gas reservoir 1150 being removably mounted within the external housing reservoir holding chamber 1113, the gas reservoir 1150 having a gas reservoir housing 1152, a nozzle 1166 coupled to a release valve 1158 mechanically coupled to the gear assembly 260 for actuation of the release valve 1158 in response to the electrical circuit 130 determining a bark has been detected by the sound sensor 110.

The pet spray training system 1100 also comprises the pressurized gas reservoir 1150 including a gas reservoir circuit 1170 which is configured to record the number of actuations of the pet spray training system.

The pet spray training system 1100 also comprises the gas reservoir circuit 1170 also records the duration of the actuation of the pet spray training system.

The pet spray training system 1100 also comprises a tubular plunger 1124 mechanically coupled to the gear assembly, the tubular plunger having a channel 1126 there through extending from a plunger bottom opening 1128 to a plunger top opening 1130. The nozzle 1166 of the pressurized gas reservoir is mounted within the plunger bottom opening 1130.

The pet spray training system 1100 also comprising the plunger 1124 being mounted for reciprocal movement relative to the external housing. The inward movement of the plunger 1124 actuates the release valve 1160.

The pet spray training system 1100 also comprising the gas reservoir housing 1152 having a tubular valve mount 1158 configured to receive the release valve 1160 therein.

The pet spray training system 1100 also comprising the gas reservoir housing 1152 has a nozzle opening 1155 there through. The nozzle 1166 extends through the nozzle opening 1155 of the gas reservoir housing 1152.

An pet spray training system 1100 is comprising a receiver housing having an internal gas reservoir holding chamber 1113, a sensor 110 configured to produce electrical output signals in response to the sensing of a noise, an electrical circuit 130 electrically coupled to the sensor, the electrical circuit processes the electrical output signals from the sensor to determine whether the sensor has sensed the bark of a dog. The pet stray training system also includes a motor 164 electrically coupled to the electrical circuit, a battery electrically coupled to the motor, a mechanical assembly 260 coupled to the motor, a pressurized gas reservoir containing a bark deterrent fluid under pressure. The pressurized gas reservoir 1150 is removably mounted within the internal gas reservoir holding chamber. The pressurized gas reservoir has a gas reservoir housing 1152, a nozzle, 1166 a release valve 1158 in fluid communication with the nozzle and actuateable by the mechanical assembly upon actuation of the motor.

An pet spray training system 1100 is comprising a receiver housing, a bark sensor 110, a processor 130 coupled to the bark sensor, a motor 164 electrically coupled to the processor, a battery 1120 electrically coupled to the motor and the processor, and a mechanical assembly 260 coupled to the motor. The pet spray training system also includes a pressurized gas reservoir 1150 containing a pressurized bark deterrent gas, the pressurized gas reservoir being removably mounted within the receiver housing. The pressurized gas reservoir has a gas reservoir housing 1152, a nozzle 1166, a release valve 1158 in fluid communication with the nozzle. The release valve is actuated by the mechanical assembly upon actuation of the motor in response to the bark sensor and processor sensing a dog's bark.

An pet spray training system 1100 is comprising an external housing defining a gas reservoir chamber, a wireless receiver, an electrical circuit electrically coupled to the wireless receiver which processes electrical output signals from the wireless receiver, a motor 164 electrically coupled to the electrical circuit, a battery electrically coupled to the motor, a gear assembly coupled to the motor, and a pressurized gas reservoir 1150 containing a bark deterrent fluid under pressure. The pressurized gas reservoir is removably mounted within the external housing gas reservoir chamber. The pressurized gas reservoir has a gas reservoir housing, a nozzle 1166 coupled to a release valve 1158 mechanically coupled to the gear assembly for actuation of the release valve in response to the electrical circuit receiving a signal from the wireless receiver.

An pet spray training system 1100 comprising a receiver housing, a wireless receiver, a processor 130 coupled to the wireless receiver, a motor 164 electrically coupled to the processor, a battery electrically coupled to the motor and the processor, a mechanical assembly coupled to the motor, and a pressurized gas reservoir 1150 containing a pressurized bark deterrent gas. The pressurized gas reservoir being removably mounted within the receiver housing. The pressurized gas reservoir having a gas reservoir housing 1152, a release valve 1158 in fluid communication with the nozzle. Whereby, the release valve is actuated by the mechanical assembly upon actuation of the motor in response to the wireless receiver receiving a wireless signal.

It will be appreciated that the inventions are susceptible to modification, variation and change without departing from the spirit thereof.

We claim:

1. An animal behavior modification device, comprising:
   a sensor configured to receive input, and in response thereto generate electrical output signals;
   an electrical circuit which processes the electrical output signals to determine whether the sensor input is characteristic of the bark of a dog, and in response to a dog bark determination, emits an actuation signal;
   a motor module electrically coupled to the electrical circuit and configured to rotate a shaft in response to receiving the actuation signal;
   at least one gear coupled to the shaft;
   a first canister configured to hold a bark deterrent fluid under pressure;
   an actuation arm movable in response to rotation of the shaft, wherein rotation of the shaft generates rotational movement in the at least one gear, which in turn generates movement in the actuation arm to cause a momentary release of the bark deterrent fluid from the first canister;
   a battery arranged to provide power to the motor module, the sensor, and the electrical circuit; and
   a housing holding at least the sensor, the electrical circuit, the first canister, the actuation arm, the motor module and the battery, and with the housing being configured to be coupled to a collar of a dog.

2. The animal behavior modification device of claim 1, wherein the at least one gear comprises a gear assembly comprising a series of gears having teeth.

3. The animal behavior modification device of claim 2, wherein the bark deterrent fluid comprises a solution that is offensive to one or more senses of a dog.

4. The animal behavior modification device of claim 2, comprising:

a cam body having a cam surface, wherein the cam body is coupled to the at least on;

gear, wherein the rotation of the motor shaft rotates the cam body, wherein the actuation arm is configured to ride along the cam surface such that the actuation arm is cyclically depressed and released as the cam body is rotated, wherein depressing the actuation arm causes a spray nozzle of the first canister to be depressed, thereby releasing bark deterrent fluid from the first canister.

5. A method for modifying the behavior of an animal, comprising the steps of:

providing an animal behavior modification device comprising:

a sensor tuned to receive sound frequencies, and in response to generate electrical signals, a filter which conditions the electrical signals from the sensor, a first canister holding a bark deterrent fluid under pressure, a motor module electrically coupled to the filter and configured to rotate a shaft for a designated period of time in response to receiving conditioned electrical signals from the filter indicative of the bark of a dog;

at least one gear operatively connected to the shaft;

a spray nozzle associated with the first canister;

an actuation arm movable in response to rotation of the shaft, wherein rotation of the shaft generates rotational movement in the at least one gear, which in turn generates movement in the actuation arm to cause a momentary release of the pressurized fluid from the first canister;

a battery arranged to provide power to the motor module and to electrical circuitry associated with the filter; and a housing for holding at least the sensor, the filter, the first canister, the actuation arm, the motor module and the battery;

securing the housing to a collar of a dog; and activating the motor module and shaft in response to the sensing of a bark from the dog, thereby causing bark deterrent fluid to be released for the designated period of time and to be sensed by the dog.

6. The method of claim 5, wherein:

the at least one gear comprises a gear assembly comprising a series of gears having teeth; and the bark deterrent fluid comprises a solution that is offensive to one or more senses of a dog.

7. The animal behavior modification device of claim 6, comprising:

a cam body having a cam surface, wherein the cam body is coupled to the at least one gear, wherein the rotation of the shaft rotates the cam body, wherein the actuation arm is configured to ride along the cam surface such that the actuation arm is cyclically depressed and released as the cam body is rotated, wherein depressing the actuation arm causes the spray nozzle to be depressed, thereby releasing bark deterrent fluid from a canister under pressure.

* * * * *